US012399572B2

(12) United States Patent
Ng et al.

(10) Patent No.: US 12,399,572 B2
(45) Date of Patent: *Aug. 26, 2025

(54) METHODS AND SYSTEMS FOR TOUCHLESS CONTROL WITH A MOBILE DEVICE

(71) Applicant: NEX Team Inc., San Jose, CA (US)

(72) Inventors: Wang Fai Ng, Hong Kong (HK); Wing Hung Chan, Hong Kong (HK); Long Mak, Hong Kong (HK); Keng Fai Lee, Cupertino, CA (US); On Loy Sung, Hong Kong (HK)

(73) Assignee: NEX Team Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,764

(22) Filed: Jan. 4, 2024

(65) Prior Publication Data
US 2024/0134463 A1 Apr. 25, 2024

Related U.S. Application Data

(63) Continuation of application No. 16/824,950, filed on Mar. 20, 2020, now Pat. No. 11,868,536, which is a (Continued)

(51) Int. Cl.
*G06F 3/01* (2006.01)
*G06F 3/04812* (2022.01)
(Continued)

(52) U.S. Cl.
CPC .......... *G06F 3/017* (2013.01); *G06F 3/04812* (2013.01); *G06F 3/04815* (2013.01);
(Continued)

(58) Field of Classification Search
CPC .. G06F 3/017; G06F 3/04812; G06F 3/04815; G06T 7/73; G06V 40/28; G06N 3/08
See application file for complete search history.

(56) References Cited

U.S. PATENT DOCUMENTS 7,834,847 B2 11/2010 Boillot et al.
8,686,943 B1 4/2014 Rafii
(Continued)

OTHER PUBLICATIONS

Krzysztof Przednowek, et al., "A System for Analysing the Basketball Free Throw Trajectory Based on Particle Swarm Optimization," Applied Sciences, 2018, vol. 8, Issue 11, p. 2090, MDPI, Basel, Switzerland.
(Continued)

*Primary Examiner* — Ariel A Balaoing
(74) *Attorney, Agent, or Firm* — American Patent Agency PC; Daniar Hussain; Stephen M. Hou

(57) ABSTRACT

Methods and systems for touchless control of a device include receiving at least one image; determining a first map, the first map including a function that generates a correspondence between data associated with the image to a feature space; determining a second map including a representation of a user in the image based on the first map; determining a third map comprising a field associated with the data in the image; determining a characteristic of the user based on one or more of the second map and the third map; and tracking the characteristic of the user to generate a historical data of the characteristic for performing the touchless control of the device.

18 Claims, 18 Drawing Sheets

Related U.S. Application Data continuation of application No. 16/432,575, filed on Jun. 5, 2019, now Pat. No. 10,620,713.

(51) Int. Cl.
| | |
|---|---|
| *G06F 3/04815* | (2022.01) |
| *G06N 3/08* | (2023.01) |
| *G06T 7/73* | (2017.01) |
| *G06V 40/20* | (2022.01) |

(52) U.S. Cl.
CPC ............... *G06N 3/08* (2013.01); *G06T 7/73* (2017.01); *G06V 40/28* (2022.01)

(56) References Cited

U.S. PATENT DOCUMENTS

| | | | |
|---|---|---|---|
| 9,886,624 | B1 | 2/2018 | Marty et al. |
| 10,010,778 | B2 | 7/2018 | Marty et al. |
| 2007/0130547 | A1 | 6/2007 | Boillot |
| 2010/0278384 | A1 | 11/2010 | Shotton et al. |
| 2010/0295781 | A1 | 11/2010 | Alameh |
| 2010/0309122 | A1 | 12/2010 | Abe |
| 2011/0110560 | A1* | 5/2011 | Adhikari ............... G06F 3/017 |
| | | | 382/103 |
| 2012/0070070 | A1* | 3/2012 | Litvak ................ G06F 3/0304 |
| | | | 382/154 |
| 2012/0239174 | A1* | 9/2012 | Shotton ................ G06V 40/10 |
| | | | 382/218 |
| 2012/0277001 | A1 | 11/2012 | Lansdale et al. |
| 2013/0303281 | A1 | 11/2013 | Argiro |
| 2014/0104168 | A1 | 4/2014 | Hegde |
| 2014/0212008 | A1 | 7/2014 | Hatcher, II et al. |
| 2015/0261408 | A1 | 9/2015 | Ostergren |
| 2017/0168586 | A1 | 6/2017 | Sinha |
| 2018/0218243 | A1 | 8/2018 | Felsen et al. |
| 2019/0004609 | A1 | 1/2019 | Swissa |
| 2019/0025909 | A1 | 1/2019 | Mittal et al. |
| 2019/0042838 | A1 | 2/2019 | Bose et al. |
| 2019/0046886 | A1 | 2/2019 | George et al. |
| 2019/0050111 | A1 | 2/2019 | Shigeta |
| 2019/0228533 | A1* | 7/2019 | Giurgica-Tiron ....... G06F 3/015 |
| 2020/0012350 | A1* | 1/2020 | Tay ............................ G06N 5/01 |
| 2020/0058148 | A1* | 2/2020 | Blaylock ................. G06T 7/251 |
| 2020/0387232 | A1* | 12/2020 | Ng ........................ G06F 3/04815 |

OTHER PUBLICATIONS

Simone Francia, "SpaceJam: a Dataset for Basketball Action Recognition," Github Code Repository Page, available at: https://github.com/simonefrancia/SpaceJam, last access: Apr. 2, 2019.

Techsmith Corporation, "Coach's Eye," Coach's Eye website, available at: https://www.coachseye.com/, last accessed: Feb. 18, 2019.

Stats LLC, "Stats SportVU Basketball Player Tracking," SportVU website, available at: https://www.stats.com/sportvu-basketball/, last accessed: Feb. 12, 2019.

Vignesh Ramanathan, et al., "Detecting events and key actors in multi-person videos," The IEEE Conference on Computer Vision and Pattern Recognition (CVPR), 2016, pp. 3043-3053.

Mark Sandler, et al., "MobileNetV2: Inverted Residuals and Linear Bottlenecks," The IEEE Conference on Computer Vision and Pattern Recognition (CVPR), 2018, pp. 4510-4520, available at: https://arxiv.org/abs/1801.04381.

Wei Liu, et al., "SSD: Single Shot MultiBox Detector," European conference on computer vision, pp. 21-37, Springer, Cham, 2016, available at: https://arxiv.org/abs/1512.02325.

Zhe Cao, et al., "Realtime Multi-Person 2D Pose Estimation using Part Affinity Fields," Proceedings of the IEEE Conference on Computer Vision and Pattern Recognition, pp. 7291-7299, 2017, available at: https://arxiv.org/abs/1611.08050.

Andrew G. Howard, et al., "MobileNets: Efficient Convolutional Neural Networks for Mobile Vision Applications," arXiv preprint arXiv:1704.04861, 2017, available at: https://arxiv.org/abs/1704.04861.

Bluestack Systems, Inc., "Play mobile games hands-free on TV Minority Report style," BlueStacks Blog, Mar. 21, 2016, available at: https://www.bluestacks.com/blog/bluestacks-exclusives/play-mobile-games-hands-free-on-tv-minority-report-style.html.

\* cited by examiner

ACTIVATION GESTURES      101

✓ BOUNDING BOX WITHIN SCREEN AND NEAR CENTER

✗ BOUNDING BOX NOT WITHIN SCREEN

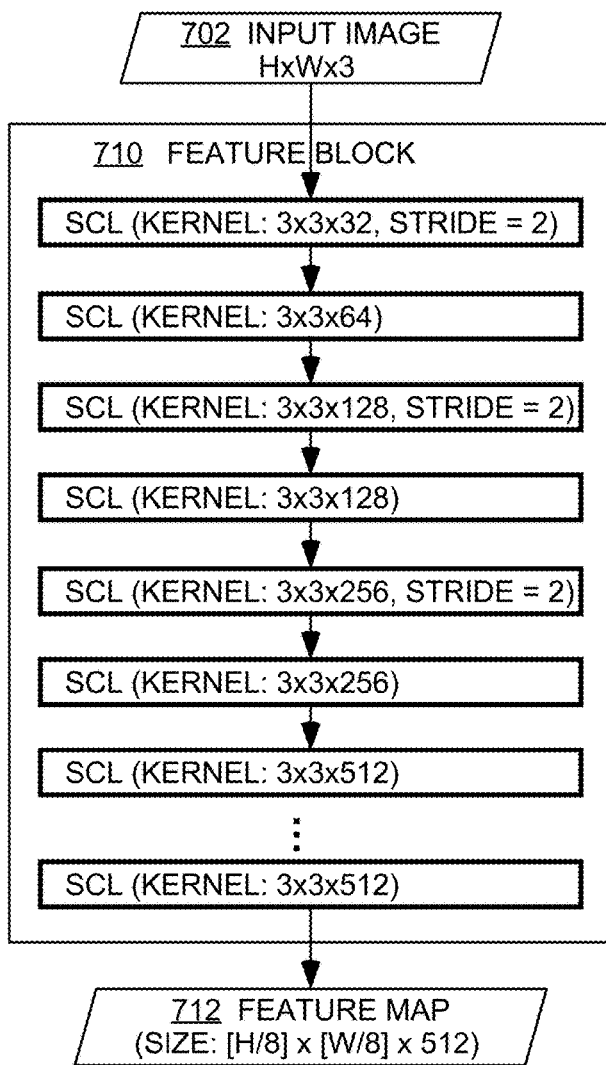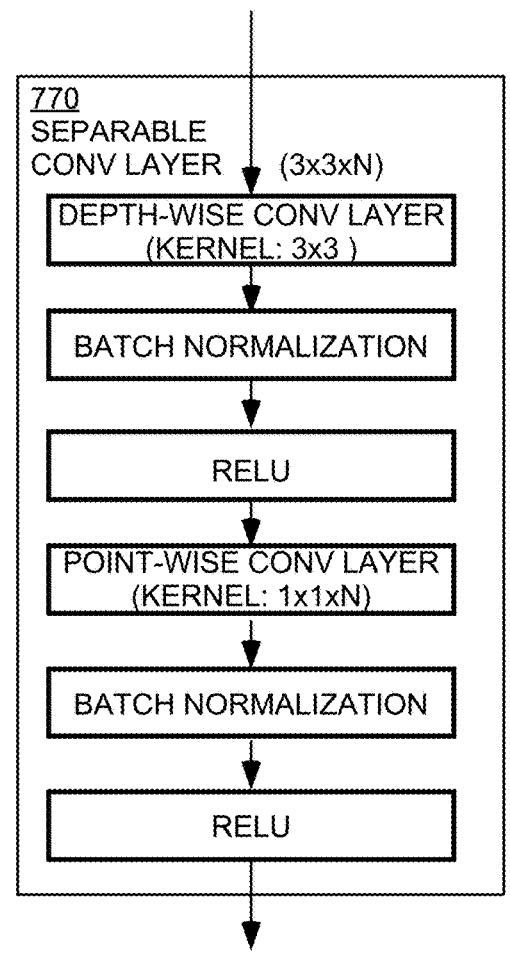
FIG. 7B
FIG. 7C

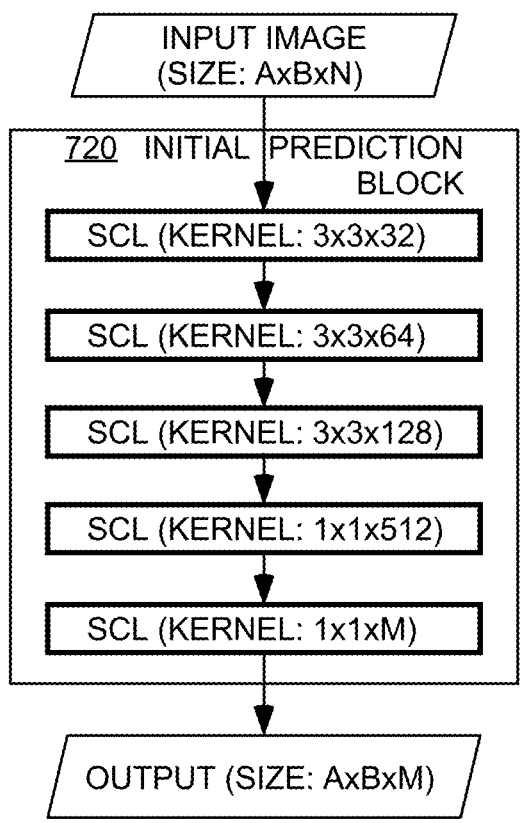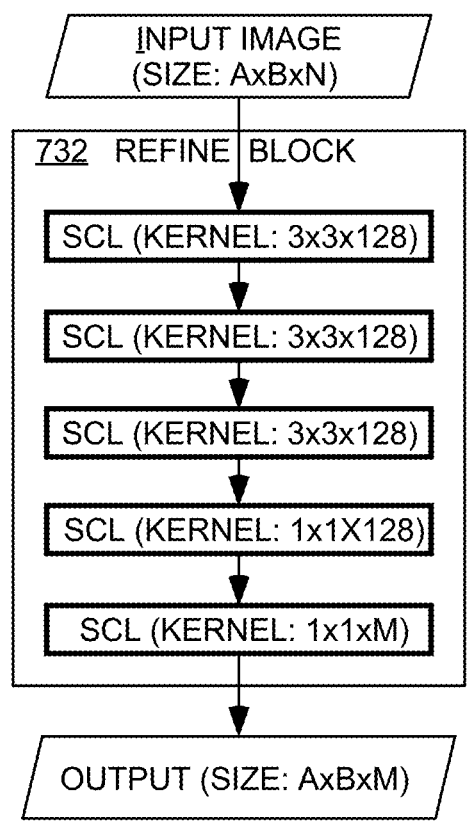
FIG. 7D
FIG. 7E

METHODS AND SYSTEMS FOR TOUCHLESS CONTROL WITH A MOBILE DEVICE

REFERENCE TO RELATED APPLICATIONS

This application is a continuation of and claims priority from U.S. Ser. No. 16/824,950, filed on 20 Mar. 2020 entitled "METHODS AND SYSTEMS FOR TOUCHLESS CONTROL WITH A MOBILE DEVICE,", which itself is a continuation of U.S. Ser. No. 16/432,575, filed on 5 Jun. 2019, entitled "METHODS AND SYSTEMS FOR TOUCHLESS CONTROL WITH A MOBILE DEVICE,". This application is also related to U.S. Ser. No. 16/109,923, filed on 23 Aug. 2018, entitled "METHODS AND SYSTEMS FOR BALL GAME ANALYTICS WITH A MOBILE DEVICE,", and U.S. Ser. No. 16/424,287, filed on 28 May 2019, entitled "METHODS AND SYSTEMS FOR GENERATING SPORTS ANALYTICS WITH A MOBILE DEVICE,". The entire disclosures of all of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of touchless control, and pertain particularly to methods and systems for touchless control (e.g., of applications and programs) with a mobile device having a camera for video capturing.

BACKGROUND OF THE INVENTION

The statements in this section may serve as a background to help understand the invention and its application and uses, but may not constitute prior art.

Touchless control and touchless user interfaces (UIs) can include systems and methods that can rely upon gestures and/or audio inputs to allow users to interact with devices. Performing gesture recognition using a device can include interpreting human gestures (e.g., a user's body and/or face motions) via mathematical algorithms. In some examples, gesture recognition can serve to allow for richer interactions between machines and humans than text-based user interfaces or existing graphical user interfaces (GUIs), which may primarily rely upon keyboard and mouse interaction.

Conventional systems may not be entirely touchless because they may be tethered to controllers. Such controllers may include specialized gloves, remote controllers, wristbands, rings, and/or the like. However, the use of controllers is inherently limiting, at least because the additional baggage that a user may need to carry, maintain, update, synchronize, calibrate, and learn to use. Further, controllers may be bulky and/or may include unintuitive usage protocols, and it may take time for a user to be fully trained to use all of a controller's features.

Therefore, in view of the aforementioned difficulties, there is an unsolved need to provide enhanced touchless control mechanisms of user interactions with devices (e.g., mobile phones, tablets, laptops, and/or the like). In addition, it would be an advancement in the state of the art of touchless control to provide systems and methods to provide the enhanced touchless control, while maintaining minimal delay and data transfer overhead, such that the entire system can be implemented on a single mobile device such as a smartphone or a tablet.

It is against this background that various embodiments of the present invention were developed.

BRIEF SUMMARY OF THE INVENTION

Some embodiments of the present invention include methods and systems of touchless control, which can be implemented, in some examples, on mobile devices.

In some aspects, a device is described. The device can include at least one memory device that stores computer-executable instructions; and at least one processor configured to access the memory device. The processor can be configured to execute the computer-executable instructions to receive at least one image; determine a first map, the first map including a function that generates a correspondence between data associated with the image to a feature space; determine a second map including a representation of a user in the image based on the first map; determine a third map including a field associated with the data in the image; determine a characteristic of the user based on one or more of the second map and the third map; track the characteristic of the user for performing control of the device to generate a historical data of the characteristic; determine, based on the tracking, a mapping between the characteristic and an input feature associated with the device; modify the input feature to a first location based on the mapping; and modify the input feature to a second location different from the first location based on the historical data.

In some respects, the determining the characteristic includes computer-executable instructions to determine that the characteristic has an associated duration exceeding a predetermined threshold. In some respects, the tracking the characteristic includes computer-executable instructions to apply a filter to measurements during the tracking. The device may further include computer-executable instructions to determine a second mapping between a second characteristic of the user and the input feature by applying a mathematical transformation to the characteristic. The device may further include computer-executable instructions to modify the input feature at a different speed or at a different precision based on at least one of the mapping or the second mapping.

The device may further include computer-executable instructions to track the characteristic of the user at a frame rate; determine that a value of a refresh rate associated with the device is different than a value of the frame rate; and modify the input feature using a smoothing function, the smoothing function including parameters that are determined based on at least one of the frame rate and the refresh rate.

In some respects, a method is described. The method includes receiving at least one image; determining a first map, the first map including a function that generates a correspondence between data associated with the image to a feature space; determining a second map including a representation of a user in the image based on the first map; determining a third map including a field associated with the data in the image; determining a characteristic of the user based on one or more of the second map and the third map; and tracking the characteristic of the user for performing control of the device to generate a historical data of the characteristic.

In some respects, the method further includes determining, based on the tracking, a mapping between the characteristic and an input feature associated with the device; modifying the input feature to a first location based on the mapping; and modifying the input feature to a second location different from the first location based on the historical data.

In some respects, the determining the characteristic comprises determining that the characteristic has an associated duration exceeding a predetermined threshold. In some respects, the tracking the characteristic further includes applying a filter to measurements during the tracking. The method may further include determining a second mapping between a second characteristic of the user and the input feature by applying a mathematical transformation to the characteristic. The method may further include modifying the input feature at a different speed or at a different precision based on at least one of the mapping or the second mapping.

The method may further include tracking the characteristic of the user at a frame rate; determining that a value of a refresh rate associated with the device is different than a value of the frame rate; and modifying the input feature using a smoothing function, the smoothing function including parameters that are determined based on at least one of the frame rate and the refresh rate.

In other respects, a non-transitory computer-readable medium storing computer-executable instructions is described, which, when executed by a processor, cause the processor to perform operations including receiving at least one image; determining a first map, the first map including a function that generates a correspondence between data associated with the image to a feature space; determining a second map including a representation of a user in the image based on the first map; determining a third map including a field associated with the data in the image; determining a characteristic of the user based on one or more of the second map and the third map; and tracking the characteristic of the user for performing control of the device to generate a historical data of the characteristic.

In some respects, the computer-executable instructions to determine the characteristic include computer-executable instructions to determine, based on the tracking, a mapping between the characteristic and an input feature associated with the device; modify the input feature to a first location based on the mapping; and modify the input feature to a second location different from the first location based on the historical data.

In other respects, the computer-executable instructions to determine the characteristic include computer-executable instructions to determine that the characteristic has an associated duration exceeding a predetermined threshold. In some respects, the computer-executable instructions to track the characteristic include computer-executable instructions to apply a filter to measurements during the tracking. The computer-executable instructions may further include determining a second mapping between a second characteristic of the user and the input feature by applying a mathematical transformation to the characteristic. The computer-executable instructions may further include modifying the input feature at a different speed or at a different precision based on at least one of the mapping or the second mapping.

The computer-executable instructions may further include tracking the characteristic of the user at a frame rate; determining that a value of a refresh rate associated with the device is different than a value of the frame rate; and modifying the input feature using a smoothing function, the smoothing function including parameters that are determined based on at least one of the frame rate and the refresh rate.

Yet other aspects of the present invention include methods, processes, and algorithms comprising the steps described herein, and also include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 7B is a detailed block diagram illustrating an exemplary Feature Block, in accordance with example embodiments of the disclosure;

FIG. 7C is a detailed block diagram illustrating an exemplary separable convolutional neural network layer, in accordance with example embodiments of the disclosure;

FIG. 7D is a detailed block diagram illustrating an exemplary Initial Prediction Block, in accordance with example embodiments of the disclosure;

FIG. 7E is a detailed block diagram illustrating an exemplary Refine Block, in accordance with example embodiments of the disclosure;

DETAILED DESCRIPTION OF THE INVENTION

Figure 1A:
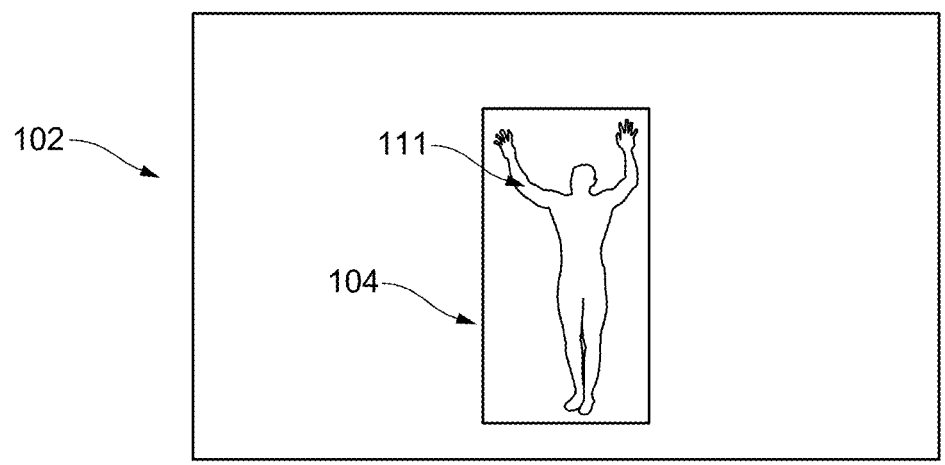
FIG. 1A shows diagrams illustrating a user in different positions with respect to a camera of a user device leading to the disclosed systems generating different bounding boxes for the user, in accordance with example embodiments of the disclosure.
Figure 1A:
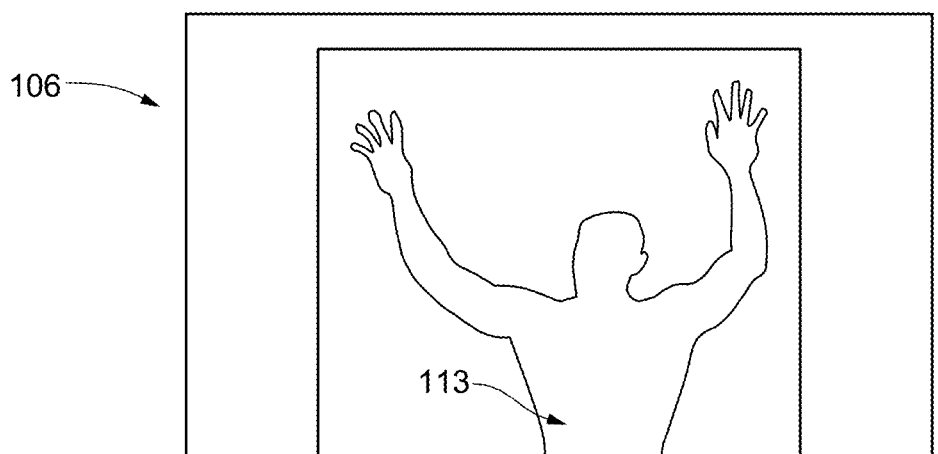

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Overview

Embodiments of the present invention may be implemented in various ways, including as computer program products comprising articles of manufacture, such as a non-transitory computer-readable storage medium storing program codes, executable instructions, and/or the like. Various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail. It would be understood by persons of ordinary skills in the art that the block diagrams, schematics, and flowchart illustrations as presented herein may be implemented in the form of a computer program product, a hardware product, a combination of computer program and hardware product, and/or apparatus, systems, computing devices, and/or the like to execute instructions, operations, process steps as presented.

Applications of the present invention include exercise, including both indoor and outdoor exercise regimens, such as but not limited to basketball dribbling exercises, in-place running, Cross-fit-type exercises, and so forth. Other applications include lectures and presentations, for controlling cursors and/or pointers instead of using a physical laser pointer. Other applications also include more sophisticated digital manipulation of on-screen images using a laptop and a projector. One of ordinary skill in the art will recognize other applications of the present invention in light of this disclosure.

The terms "mobile device" and "user device" is to be understood generally, and includes but is not limited to, for example, computers, computing entities, mobile phones, tablets, phablets, notebooks, laptops, desktop computers, gaming consoles (e.g., Xbox, Play Station, Wii), watches, glasses, televisions, wearable items/devices, kiosks, input terminals, set-top boxes, the like, and/or any combination of devices or entities adapted to perform the functions, operations, and/or processes described herein. In one embodiment, the "mobile device" or "user device" has at least one integrated camera, or at least one external camera, operably connected to a hardware processor, as well as other appropriate hardware, that is adapted to perform the functions, operations, and/or processes described herein.

One of ordinary skill in the art would recognize that "cursor" and "cursor position" is to be understood generally, and not specifically to a literal mouse or trackpad cursor. The term "cursor" is meant to encompass any control element(s) on the user device. For example, the "cursor" can include a pointer at a fixed coordinate on the user device, and can also include a horizontal position in a scrolling operation over an entire screen of the user device.

FIG. 1A shows diagrams illustrating a user in different positions with respect to a camera of a user device leading to the disclosed systems generating different bounding boxes for the user, in accordance with example embodiments of the disclosure. In particular, FIG. 1A includes a diagram 101 showing screens 102 and 106 and bounding boxes 104 and 108, to be described. In some examples, an activation of a portion of the user's body can be enabled when the disclosed systems determine that a pose bounding box associated with a user is valid, within threshold dimensions of the screen of the user device, near the center of the screen of the user device (e.g., within a threshold amount from the center of the screen, and within a threshold distance from the user, and so on.) In particular, diagram 101 shows a first situation in which a bounding box 104 is within the dimensions of screen 102. Further, the bounding box 104 is relatively near the center of screen 102. In this case, the disclosed systems may be configured to detect activation motions and/or gestures associated with the user 111. In contrast, diagram 101 shows a second situation in which a bounding box 108 is not fully within the dimensions of screen 106 (e.g., bounding box 108 extends past the bottom side of screen 106.) This may be due to the fact that the user device (not shown) may be too close to the user 113 and/or at a particular angle with respect to the body of the user that does not necessarily capture the full extent of the user's body. Accordingly, the disclosed systems may be configured to ignore the activation motions and/or gestures associated with the user 113.

Figure 1B:
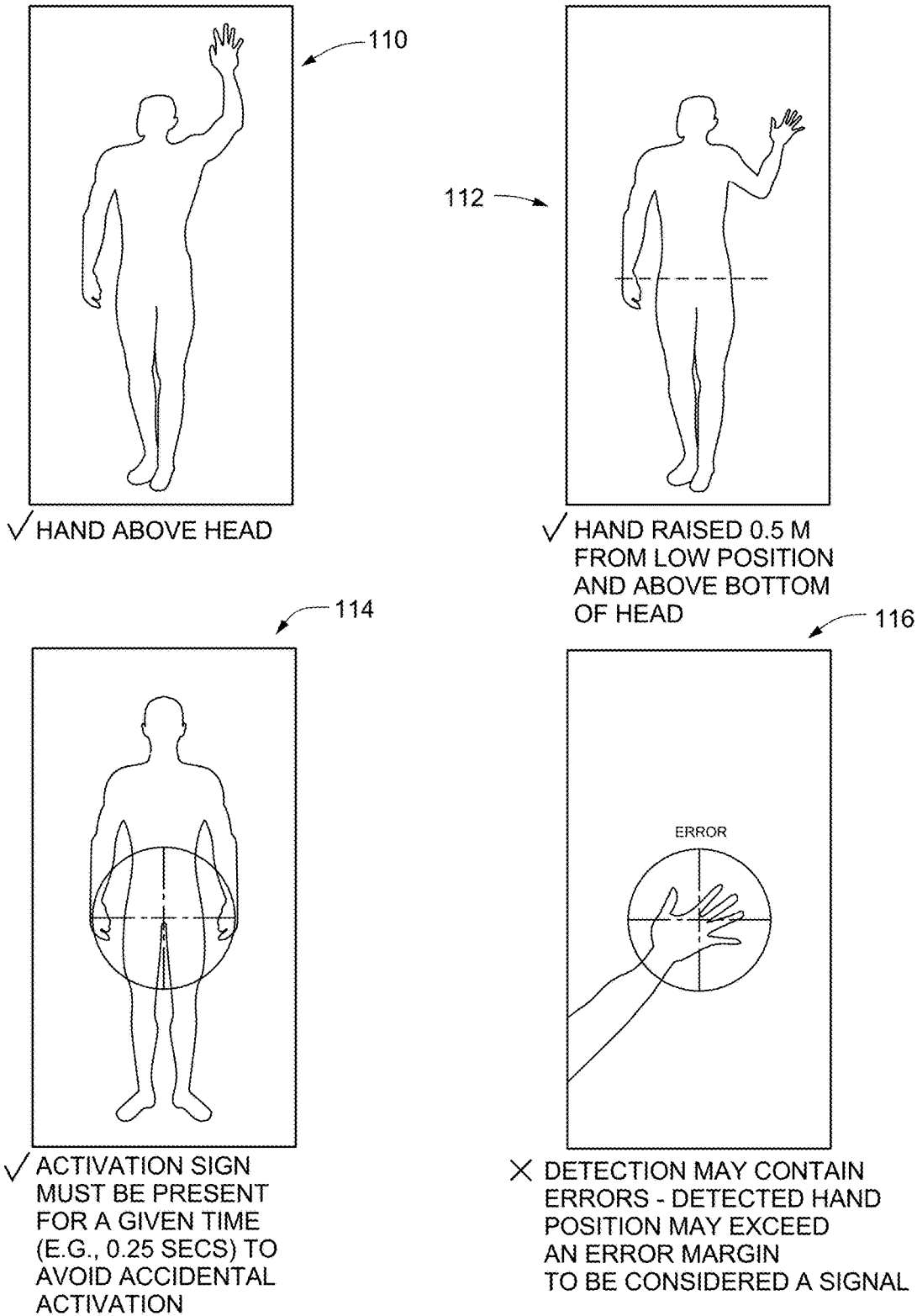
FIG. 1B shows diagrams illustrating a user having different example gestures that may be interpreted differently by the disclosed systems, in accordance with example embodiments of the disclosure.

FIG. 1B shows a diagram 103 illustrating a user having different example gestures that may be interpreted differently by the disclosed systems, in accordance with example embodiments of the disclosure. In some examples, the disclosed systems can include an activation feature whereby a user performs some gestures to activate touchless control with a portion of his or her body (e.g., via his or her hand). In other examples, the disclosed systems can include a tracking feature whereby an activated portion of the user's body (e.g., an activated user's hand) is tracked and is used to perform touchless control. In some aspects, touchless control can include controlling a cursor position. In some aspects, the disclosed systems can map the activated portion of the user's body (e.g., an activated user's hand) to the cursor position. Further, the disclosed systems can apply a mathematical transformation such that smaller hand movements result in more cursor movements. In other examples, the disclosed systems can enable switching a portion of the user's body for another portion (e.g., one hand of the other hand) for implementing touchless control. Moreover, the disclosed systems can enable a deactivation of the touchless control, for example, using a predetermined gesture or set of gestures, using a voice command, and/or the like.

In some examples, the disclosed systems can implement predetermined rules associated with the gestures. For example, the disclosed systems can rank the degree of confidence in recognizing a given gesture as an activation gesture to commence touchless control. For example, as shown in pose 110, the disclosed systems can specify that if a user's first hand is above the user's head, the gesture can be classified as a relatively high strength activation signal. In other examples, the disclosed systems can specify that if the user's hand is above the user's shoulder, the gesture can be classified as an intermediate strength activation signal. Accordingly, the disclosed systems can be configured to wait for a predetermined duration to confirm the signal. The disclosed systems can further specify that if the user's hand is above the user's center of the chest, the gesture can be classified as a weaker activation signal, and accordingly, the disclosed systems can be configured to wait for a longer predetermined duration to confirm the signal. Further, as shown in pose 112, the disclosed systems can be configured to specify that the user's hand should be raise a certain distance above a predetermined position (e.g., the bottom of the head of the user and a waist of the user) to be considered as an activation signal. It should be noted that these gestures and signals are merely representative signals, and any other reasonable gesture can be used to activate the touchless control. In some examples, as shown in pose 114, the disclosed systems can specify that a given gesture and/or the corresponding activation signal may need to be present for predetermined duration (e.g., about 0.25 seconds or more), for example, to avoid accidental activation caused by temporary wrong detection.

In some aspects, gesture detection and subsequent gesture-based touchless control may contain various inherent sources of measurement error. Accordingly, as shown in diagram 116, the disclosed systems can specify that the detected hand position exceed a predetermined threshold error margin (e.g., approximately 0.05 meters or less) to be considered as an activation signal to register a gesture and/or a hand position. In some examples, if both hands of the user meet the activation criteria described above, the disclosed systems can determine that the hand having a relatively stronger activation signal can serve as the activated hand for purposes of touchless control. If the disclosed systems determine that the hands are at an equal position (e.g., there is a tie), the disclosed systems can specify that the hand that is raised higher be designated as the activated hand.

Figure 1C:
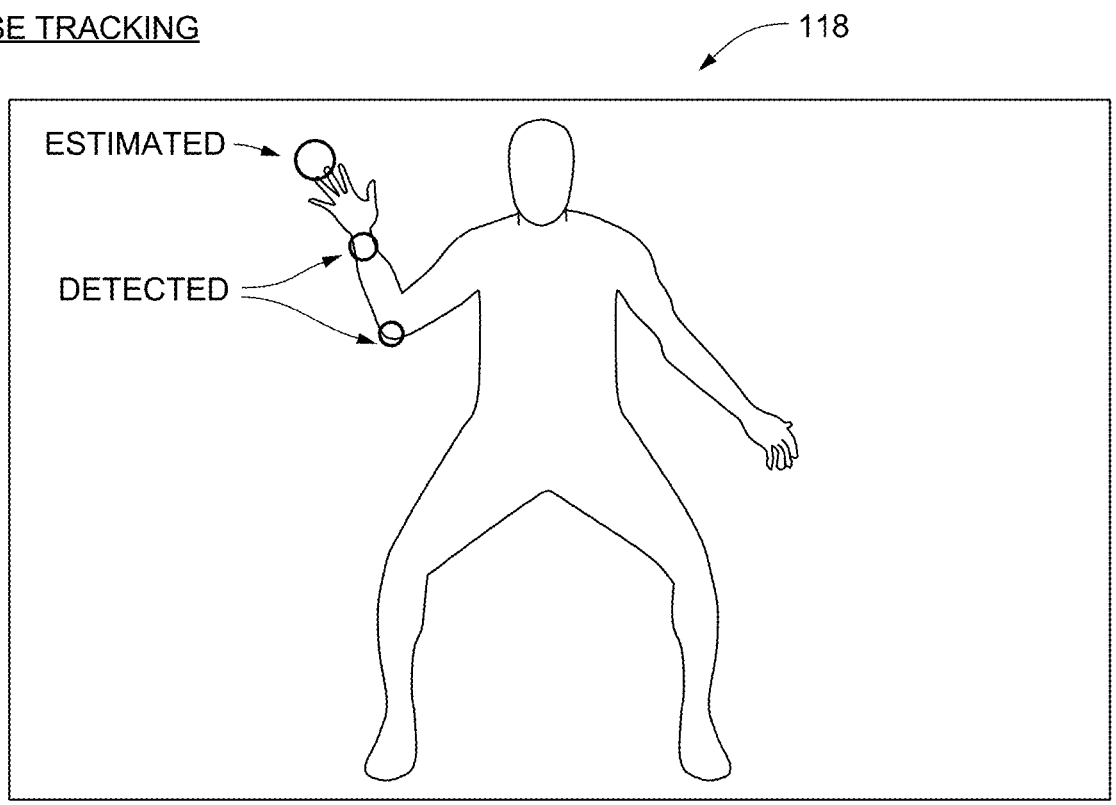
FIG. 1C shows a diagram illustrating the disclosed systems estimating a portion of the user's body from other detected portions of a user's body, in accordance with example embodiments of the disclosure.

FIG. 1C shows a diagram 105 illustrating the disclosed systems estimating a portion of the user's body from other detected portions of a user's body, in accordance with example embodiments of the disclosure. In various embodiments, the disclosed systems can track the portion of the user's body. For example, as shown in boundary box 118, the disclosed systems can estimate the hand position by generating a raw pose estimation detection that can provide an estimate of the elbow and wrist position while not necessarily estimating the hand and/or finger positions. Further, the disclosed systems can provide a hand and/or finger position estimation by running an algorithm that mathematically extends a line from the representation of the user's elbow to the user's wrist.

In various embodiments, the disclosed systems can perform a smoothing functionality as part of the tracking and/or touchless control. In particular, the points detected by the system can be noisy. For example, the detected points can have values that exhibit noise and/or jitter, even when the user's limbs are not moving significantly. Accordingly, the disclosed systems can input the position data to, for example, a Kalman filter that can be employed to smooth the detected points.

Figure 1D:
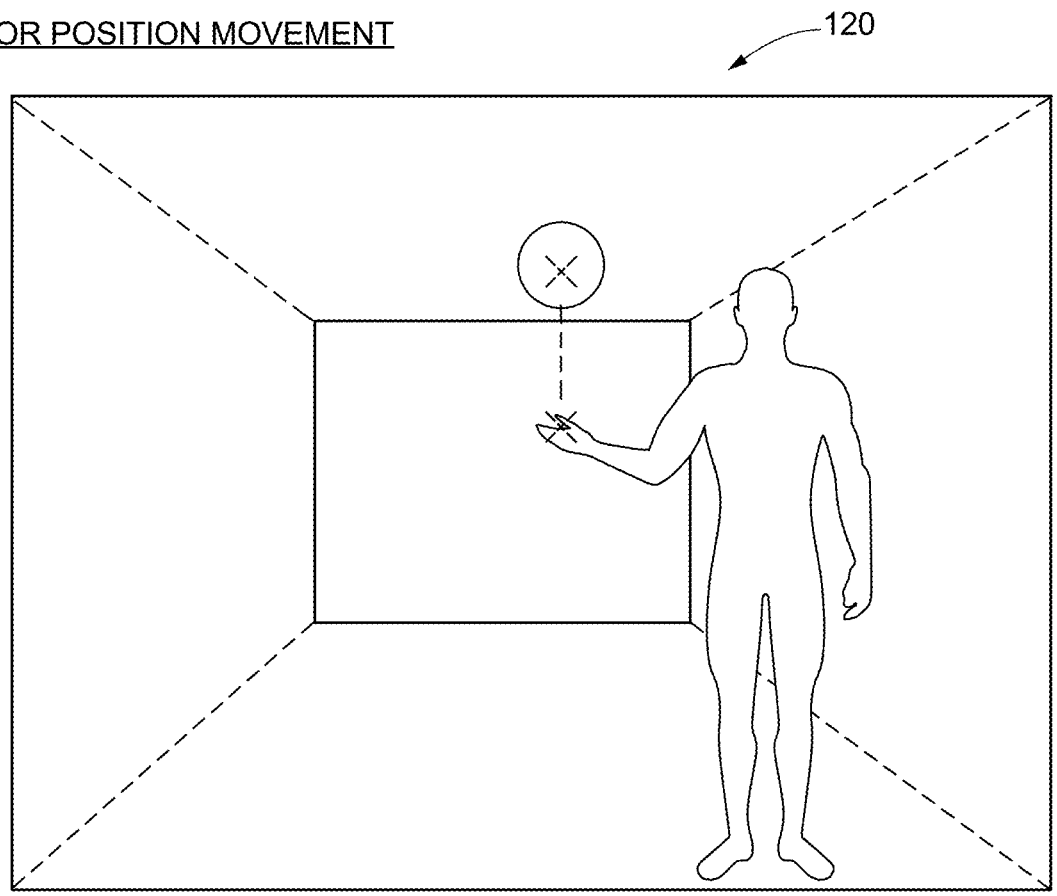
FIG. 1D shows a diagram illustrating the disclosed systems predicting a cursor position from a different cursor position and/or the user's body, in accordance with example embodiments of the disclosure.

FIG. 1D shows a diagram 107 illustrating the disclosed systems predicting a cursor position from a different cursor position and/or the user's body, in accordance with example embodiments of the disclosure. In some examples, the disclosed systems can complete data that neglects data associated with certain positions of the user's body. For example, as shown in boundary box 120, the disclosed systems may temporarily have a lapse in the detection of a portion of the user's body (e.g., an elbow and/or wrist). However, the disclosed systems can be configured such that the user experiences via a display showing that the user's touchless control is seamless. For example, the disclosed systems can use a Kalman filter to predict the position of the detected hand and display the moving position and/or the cursor smoothly, as illustrated schematically in FIG. 1D.

In other examples, the disclosed systems can incorrectly determine the hand of the user. For example, the detected left and right hand may be reversed. In other examples, the detected hands may be mixed (e.g., the left limb may be detected as both the left and the right hand). In these cases, the disclosed systems may be configured to use a best effort algorithm where previous positions are used to resolve the limbs and correctly detect the right and left limbs.

In some examples, the disclosed systems can position the cursor by directly mapping the hand position in the video to a cursor position on the screen of a user device (e.g., a mobile phone). Further, the disclosed systems can improve the user experience such that the user does not need to move his or her hand beyond a particular threshold amount to control the user interface (UI) components on the screen. In particular, the disclosed systems can apply a transformation from the hand to a cursor position, such that the cursor moves faster and more efficiently to the target UI component.

In some examples, the disclosed systems can choose an origin of the hand position to map to the cursor at a center of the screen of the user device. For example, when a right hand is being tracked, the disclosed systems can indicate that a movement of the right hand about 0.2 m right from the user's chest may move the cursor to the center of the screen of the user's device.

In some examples, the disclosed systems can be configured to provide additional smoothing of the cursor during a touchless control session. For example, the disclosed systems can be configured to accept video input of the movements of the hand of the user at about 30 frames per second (fps). Accordingly, in this example, the disclosed systems may perform pose estimation optimally at about 30 fps. However, the user device (e.g., a mobile phone) may have a different refresh rate, for example, a refresh rate of about 60 fps to about 120 fps. Accordingly, if the cursor moves about 30 fps, the cursor may lag in the presentation of the cursor movement to the user.

Thus, the disclosed systems can configure the cursor to not directly move to a target position, but rather, to move to the target progressively at a rate of about 60 fps to about 120 fps, depending on the system. In this example, the disclosed systems can be configured to use an exponential decay or any other suitable technique to smoothly move the cursor to the target position. Further, the disclosed systems can control the coefficients of the exponential decay technique (or other parameters of any suitable technique) to change the effect of the smoothing on the cursor movement.

In some aspects, the disclosed systems can stabilize the position of the cursor during user interaction. For example, when the user holds his or her hand at a relatively stable position, for example, to trigger a button press in a UI component displayed on the screen of the user device, the disclosed systems can be configured such that the cursor position is relatively stable and not jittery. However, the detected data of the user's hand motions from the sensors associated with the user device or other sensors may be inherently noisy and may contribute to jittery motion in the cursor. Accordingly, the disclosed systems can be configured to apply strong exponential decay, such that the cursor position won't change much, and appear to be stable to the user if the cursor is relatively close to its previous position.

In some aspects, the disclosed systems can implement various additional features to improve the user's experience of touchless control. In particular, the disclosed systems can make the cursor appear to move slower when the cursor is near the screen center, and move faster when the cursor is near the screen edge. This different speed of cursor movement based on the position on the screen can allow a user to perform additional fine grain control when UI components are near the center of the screen, while occasionally needing to touch UI components near an edge of the screen. In other examples, the disclosed systems can facilitate user interactions whereby moving the user's body by a predetermined amount can allow the cursor to reach further than without the user's body movement. The disclosed systems can perform this type of user interaction by using historically obtained pose estimation data. In an example, the disclosed systems can use the pose estimation data obtained from the moment of touchless control activation. Further, the disclosed systems can cause the cursor position to depend on the estimated hand position as contrasted with a background of the average positions from the current and the past body positions.

In some examples, the disclosed systems can weigh data obtained from detecting related body parts (e.g., a wrist and an elbow) equally, and use such data in hand and cursor position transformation algorithms such that errors in measuring the wrist and elbow can be averaged out. This can be contrasted with the disclosed systems, weight data obtained from one of the related body parts (e.g., the wrist node) more than the other (e.g., via extrapolation). Such an imbalanced weighing may make errors associated with the weighed body part (e.g., the wrist node's) more exaggerated.

In some examples, the disclosed systems can normalize the movements of a portion of the user's body (e.g., the user's hand) by the user's body width and/or height. Accordingly, the disclosed systems can provide a similar touchless control experience for users having different sizes and/or heights.

In some examples, the disclosed systems can determine that a particular mapping between a portion of the user's body and the screen may not be ideal. For example, the disclosed systems may determine that for the user's right hand, a pose in which the user's hand is at the top right position may be further away to the right of the user's body than a pose in which the user's hand is at the bottom right of the user's body. Accordingly, the disclosed systems may determine that a rectangular transform applied to map the user's hand position to the screen position may not be ideal, and that instead, a trapezoid-like transform (e.g., a perspective transform) may be preferable.

In some examples, the disclosed systems can implement an algorithm to detect hand switching and/or to perform a deactivation. In particular, the disclosed systems may attempt to map an activated hand. However, when there is strong signal that another hand is preferred, the disclosed systems can activate the other hand, for example, when another hand meets an activation criteria. In another aspect, when the activation signal is not strong, the disclosed systems can be configured to consider switching from tracking one hand to another hand when the currently tracked hand meets a predetermined deactivation criteria (e.g., when the currently tracked hand is determined to fall about 0.5 m below the position at the top of the screen).

In some examples, there may be a number of ways and/or reasons to deactivate the touchless control. For example, the disclosed systems may determine that no valid pose has been detected. In other examples, the disclosed systems may determine that a pose is detected; however, the disclosed systems may determine that the pose is outside the bounds of the screen, away from the center of the screen by a predetermined amount, or that the user's detected pose is too close and/or too far from the screen. In some examples, the disclosed systems may deactivate the touchless control after determining that while a given portion of the body is activated (e.g., the user's right hand is activated), the disclosed systems do not necessarily detect a signal from a related portion of the user's body (e.g., valid signal from right elbow and/or wrist of the user). In some examples, the disclosed systems may determine that if the user's hand is below a user's hip, and the user's hand is not moving, the user's hand in this case can serve as a deactivation signal. In some cases, the disclosed systems can deactivate the touchless control after the deactivation criteria is matched for a predetermined amount of time.

Figure 1E:
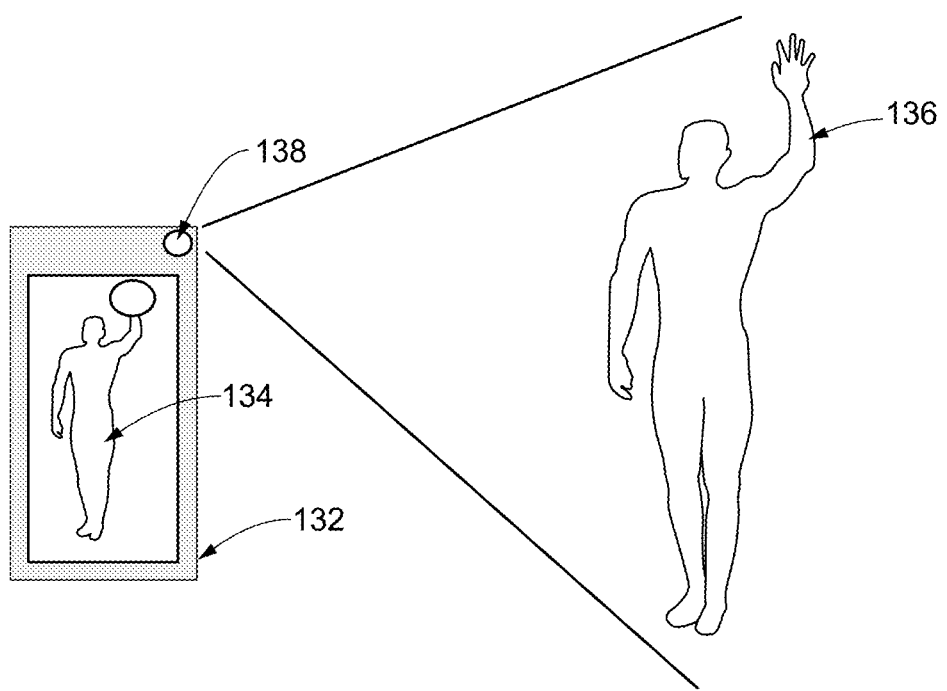
FIG. 1E shows a diagram illustrating a use case of the disclosed systems, in which a user is shown standing in front of a mobile device, and a representation of the user is detected and displayed on a screen of the mobile device, enabling touchless control of the mobile device, in accordance with example embodiments of the disclosure.

FIG. 1E shows a diagram 109 illustrating a use case of the disclosed systems, in accordance with example embodiments of the disclosure. In FIG. 1E, a user 136 is standing in front of a mobile device 132, having at least one camera 138. The disclosed system detects the user's 136 activation gesture (left hand up and above the head for a predetermined period of time), determines a pose of the user 136, and tracks a hand position of the user 136. A representation 134 of the user 136 is displayed on a screen of the mobile device 132, thus enabling touchless control of the mobile device as described herein.

Implementation Using Computer Program Products, Methods, and Computing Entities

The present invention may be implemented in a combination of hardware and/or software. An illustrative hardware and software operational environment for implementing one embodiment of the present invention is now described.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

A. Exemplary System Architecture

Figure 2:
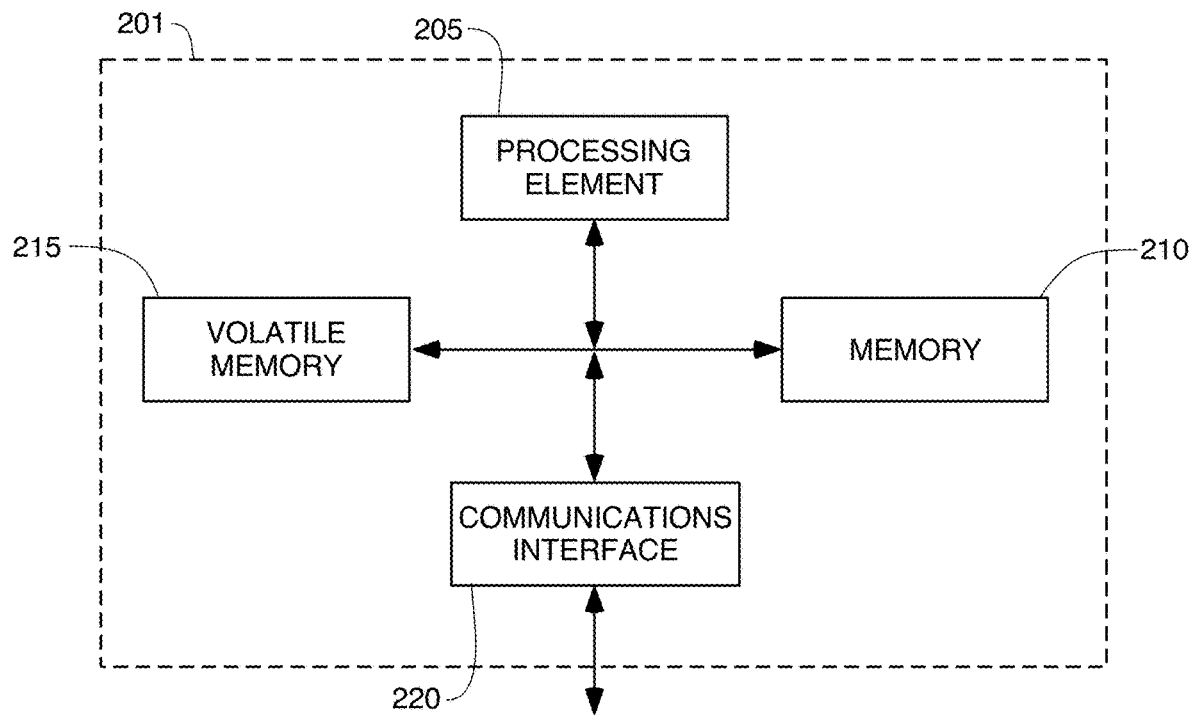
FIG. 2 is an exemplary schematic diagram of a management computing entity for implementing the present invention, in accordance with example embodiments of the disclosure.
Figure 3:
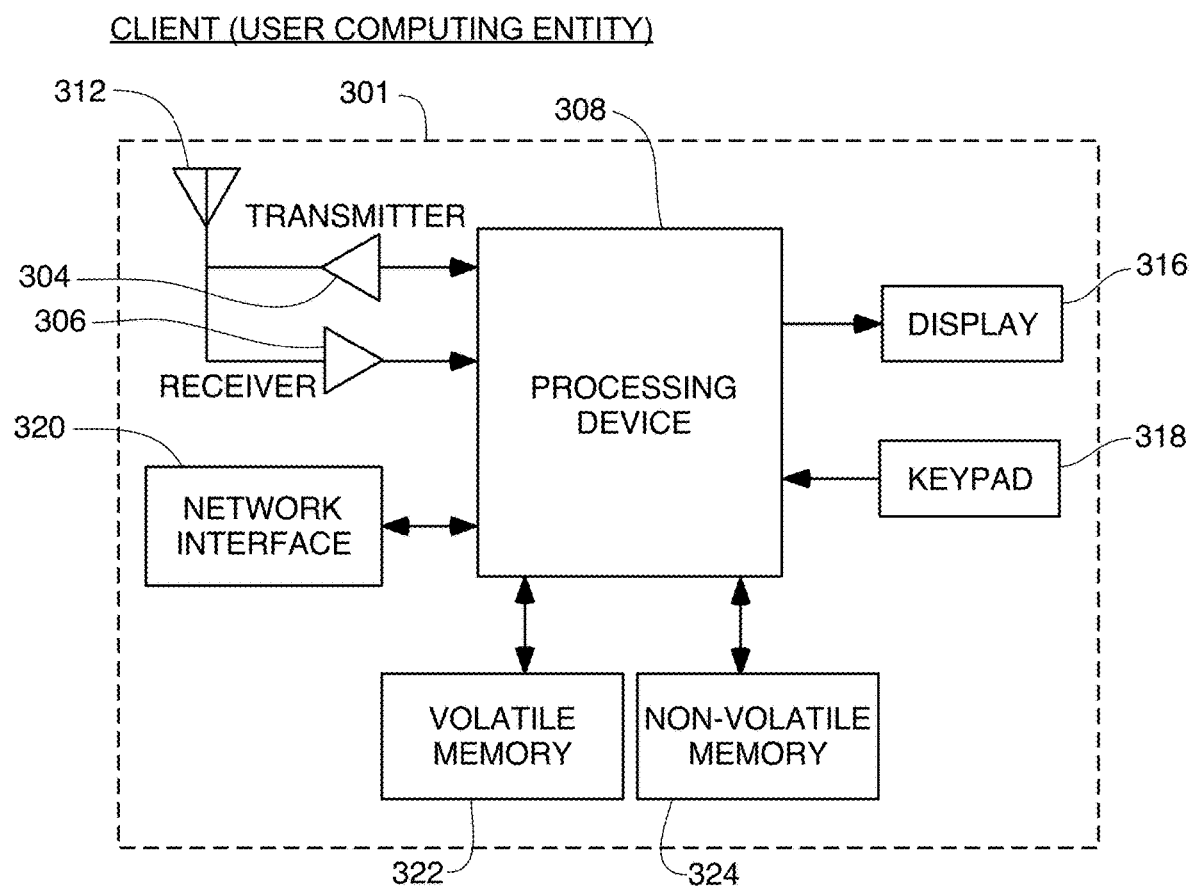
FIG. 3 is an exemplary schematic diagram of a user computing entity for implementing the present invention, in accordance with example embodiments of the disclosure.

An exemplary embodiment of the present disclosure may include one or more management computing entities 201, one or more networks, and one or more user computing entities 301, as shown in FIGS. 2-3. Each of these components, entities, devices, systems, and similar words used herein interchangeably may be in direct or indirect communication with, for example, one another over the same or different wired or wireless networks. Additionally, while FIGS. 2-3 illustrate the various system entities as separate, standalone entities, the various embodiments are not limited to this particular architecture.

B. Exemplary Management Computing Entity

FIG. 2 provides a schematic 200 of a management computing entity 201 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 201 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 201 may communicate with user computing entities 301 and/or a variety of other computing entities.

As shown in FIG. 2, in one embodiment, the management computing entity 201 may include or be in communication with one or more processing elements 205 (also referred to as processors, processing circuitry, and/or similar terms used herein interchangeably) that communicate with other elements within the management computing entity 201 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 201 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 201 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 201 with the assistance of the processing element 205 and operating system.

As indicated, in one embodiment, the management computing entity 201 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 201 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 201 may include or be in communication with one or more input elements, such as a keyboard input, a mouse input, a touch screen/display input, motion input, movement input, audio input, pointing device input, joystick input, keypad input, and/or the like. The management computing entity 201 may also include or be in communication with one or more output elements (not shown), such as audio output, video output, screen/display output, motion output, movement output, and/or the like.

As will be appreciated, one or more of the components of the management computing entity 201 may be located remotely from other management computing entity 201 components, such as in a distributed system. Furthermore, one or more of the components may be combined and additional components performing functions described herein may be included in the management computing entity 201. Thus, the management computing entity 201 can be adapted to accommodate a variety of needs and circumstances. As will be recognized, these architectures and descriptions are provided for exemplary purposes only and are not limiting to the various embodiments.

C. Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like. For instance, a user may operate a user computing entity 301 that includes one or more components that are functionally similar to those of the management computing entity 201. FIG. 3 provides an illustrative schematic 300 representative of a user computing entity 301 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 301 can be operated by various parties. As shown in FIG. 3, the user computing entity 301 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 301 may be capable of operating with one or more air interface standards, communication protocols, modulation types, and access types. More particularly, the user computing entity 301 may operate in accordance with any of a number of wireless communication standards and protocols, such as those described above with regard to the management computing entity 201. In a particular embodiment, the user computing entity 301 may operate in accordance with multiple wireless communication standards and protocols, such as 5G, UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 301 may operate in accordance with multiple wired communication standards and protocols, such as those described above with regard to the management computing entity 201 via a network interface 320.

Via these communication standards and protocols, the user computing entity 301 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 301 can also download changes, add-ons, and updates, for instance, to its firmware, software (e.g., including executable instructions, applications, program modules), and operating system.

According to one embodiment, the user computing entity 301 may include location determining aspects, devices, modules, functionalities, and/or similar words used herein interchangeably. For example, the user computing entity 301 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 301 position in connection with a variety of other systems, including cellular towers, Wi-Fi access points, and/or the like. Similarly, the user computing entity 301 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 301 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 301 to interact with and/or cause display of information from the management computing entity 201, as described herein. The user input interface can comprise any of a number of devices or interfaces allowing the user computing entity 301 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 301 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 301 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 301. As indicated, this may include a user application that is resident on the entity or accessible through a browser or other user interface for communicating with the management computing entity 201 and/or various other computing entities.

In another embodiment, the user computing entity 301 may include one or more components or functionality that are the same or similar to those of the management computing entity 201, as described in greater detail above. As will be recognized, these architectures and descriptions are provided for exemplary purposes only and are not limiting to the various embodiments.

Machine Vision and Machine Learning Modules

The present invention may be implemented using one or more machine vision and machine learning modules implementing one or more algorithms implemented in non-transitory storage medium having program code stored thereon, the program code executable by one or more processors, as described above. The following description describes in detail some of the illustrative machine vision and machine learning algorithms useful for implementing some embodiments of the present invention.

A. Illustrative Machine Vision Architectures

Various exemplary machine vision algorithms are within the scope of the present invention used for performing gesture recognition, performing pose estimation, applying smoothing functions to cursor positions, and so forth.

Figure 4:
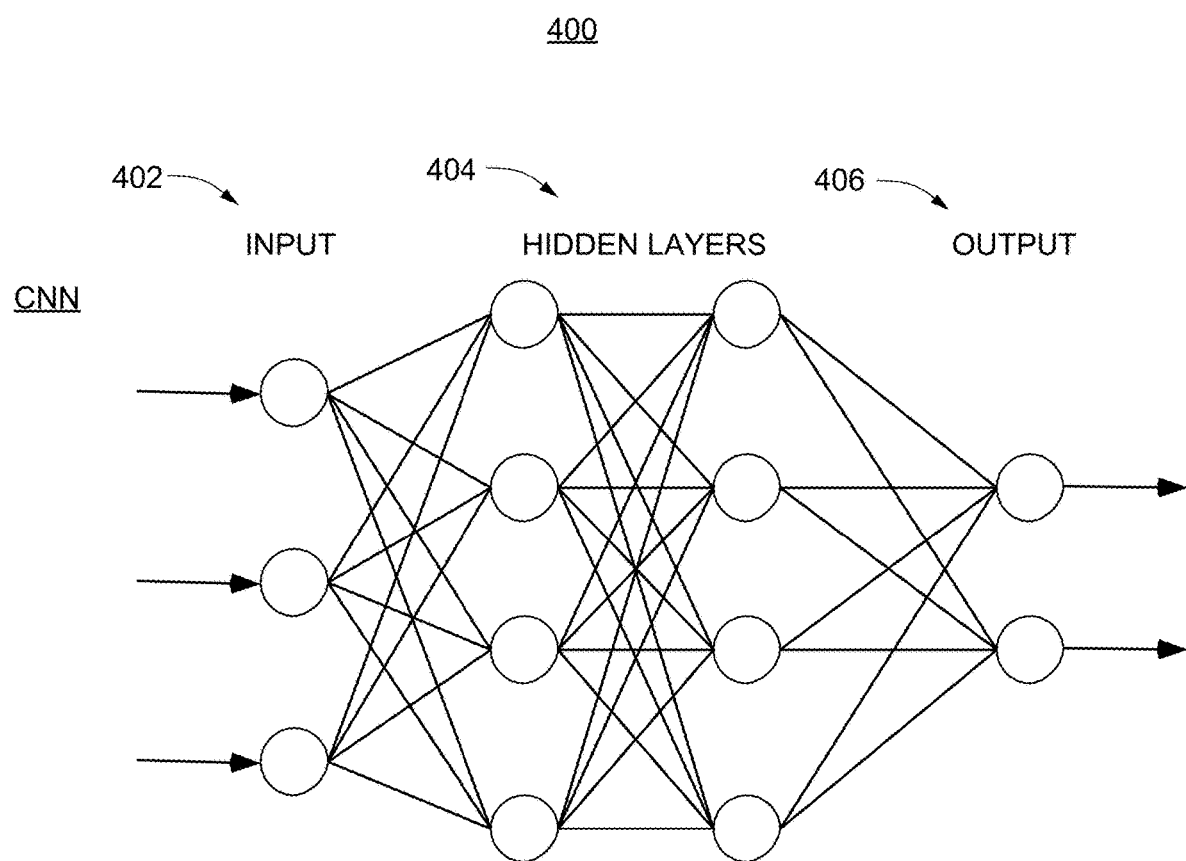
FIG. 4 shows an illustrative block diagram of a convolutional neural network (CNN) for image analysis, in accordance with one embodiment of the invention.

Some exemplary machine vision algorithms utilize a deep learning network (DLN), for example using a convolutional neural network (CNN). FIG. 4 shows an exemplary CNN module 400 that may be utilized for implementing various machine vision algorithms described herein. In FIG. 4, one or more input layers 402 are connected via a multiplicity of hidden layers 404 to one or more output layers 406. This neural network architecture may be trained to determine gestures and poses and other machine vision tasks required by the present invention, as would be recognized by one of ordinary skill in the art. FIG. 4 shows only one illustrative CNN architecture that is within the scope of the present invention, and the present invention is not limited to the use of CNNs. Other machine vision algorithms are also within the scope of the present invention. One specific CNN architecture is described below.

B. Illustrative Machine Learning Architectures

Various exemplary machine learning algorithms are within the scope of the present invention used for performing image recognition, gesture recognition, pose estimation, and so forth.

Figure 5:
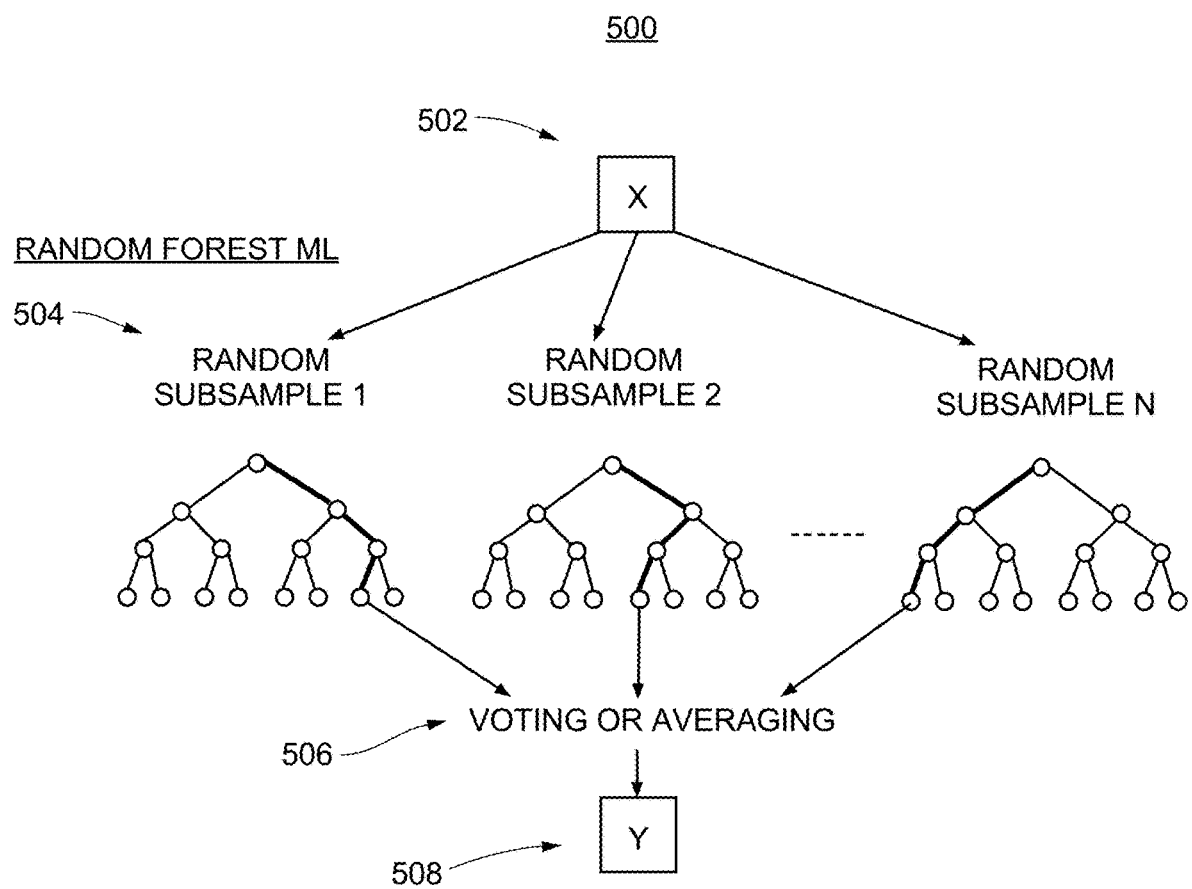
FIG. 5 shows an illustrative block diagram for a machine learning algorithm, in accordance with another embodiment of the invention.

FIG. 5 shows an illustrative diagram 500 for a machine learning algorithm used to implement image recognition, gesture recognition, pose estimation, in accordance with sample embodiments of the invention. In one embodiment, the machine learning algorithm comprises a random forest algorithm, one illustrative machine learning algorithm. Random forest algorithms use a multitude of decision tree predictors 504, such that each decision tree depends on the values of a random subset of the training data, which minimizes the chances of overfitting to the training data set. The decision tree predictors are voted or averaged 506 to obtain the predictions of the random forest algorithm. In one embodiment, the random forest algorithm is implementation as described in Leo Breiman, *Random Forests*, Machine Learning, 45, 5-32, 2001, Kluwer Academic Publishers, Netherlands, available at doi.org/10.1023/A:1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention. The input to the machine learning algorithm can include the features values 502 ($x$), or the input data described above. The output 508 of the machine learning algorithm can include the predicted gestures and/or poses associated with a user.

As noted, embodiments of devices and systems (and their various components) described herein can employ artificial intelligence (AI) to facilitate automating one or more features described herein (e.g., performing image recognition, gesture recognition, pose estimation). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier may map an input attribute vector, $z=(z1, z2, z3, z4, \ldots, zn)$, to a confidence that the input belongs to a class, as by $f(z)=$confidence(class). Such classification may employ a probabilistic and/or statistical-based analysis (e.g., factoring into the analysis utilities and costs) to determinate an action to be automatically performed. Another example of a classifier that can be employed is a support vector machine (SVM). The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

C. Training the Machine Learning Algorithms

Figure 6:
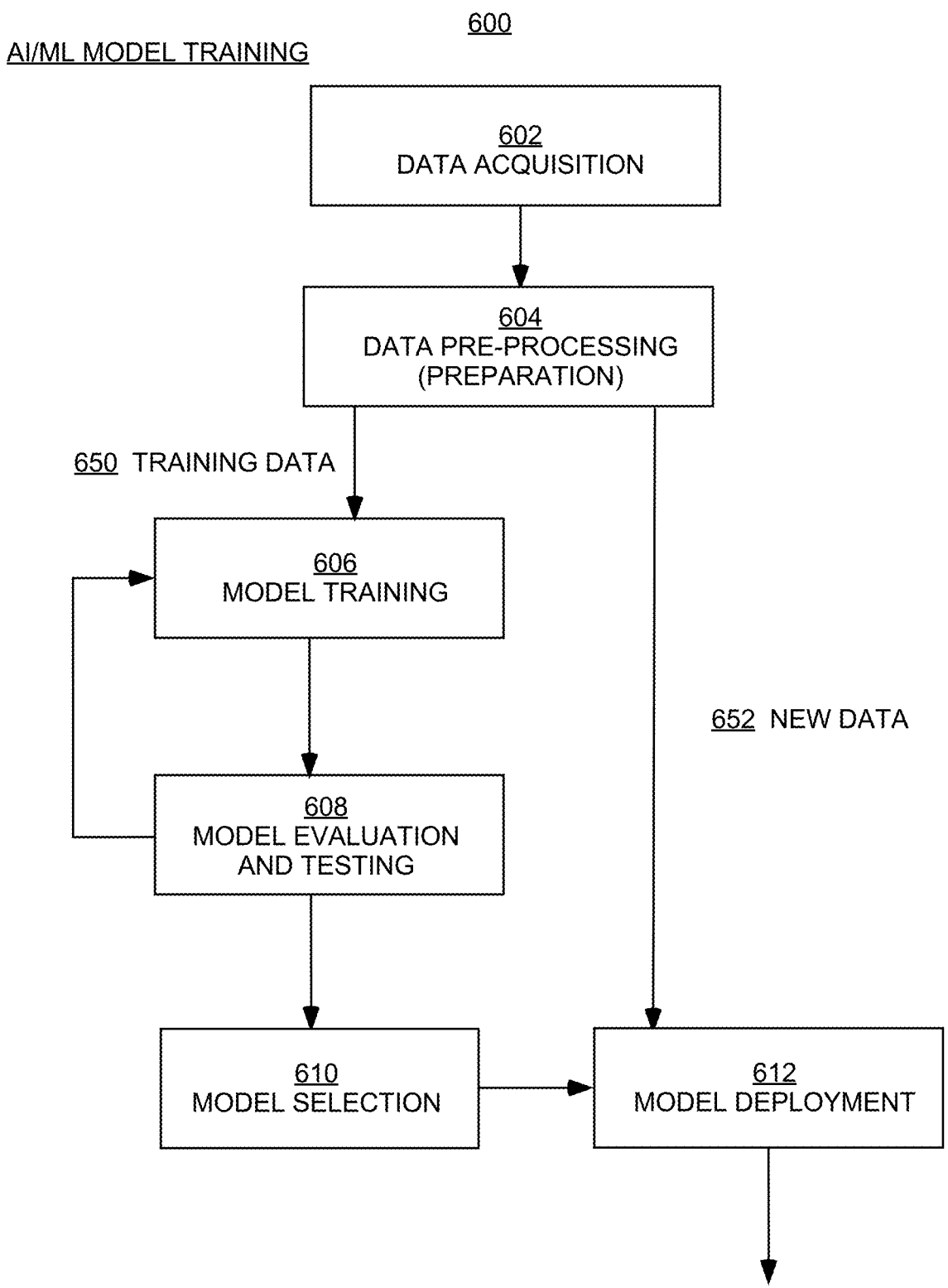
FIG. 6 shows an example flow diagram for training the machine learning algorithm, in accordance with example embodiments of the disclosure.

FIG. 6 shows an exemplary flow diagram 600 for training the machine learning (ML) algorithms, which are utilized in predicting gestures and/or poses of users performing touchless control, in accordance with example embodiments of the present invention. The training process begins at step 602, with data acquisition. At step 604, the acquired data is pre-processed (known as data preparation). At step 606, the model is trained using training data 650. At step 608, the model is evaluated and tested, and further refinements to the model are fed back into step 606. At step 610, the optimal model parameters are selected. At step 612, the model is deployed. New data 652 can now be used by the deployed model to make predictions.

A starting point for any machine learning method such as used by the machine learning component above is a documented dataset containing multiple instances of system inputs and correct outcomes (e.g., the training data). This data set can be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system output depends on (a) the pattern parameterization, (b) the learning machine design, and (c) the quality of the training database. These components can be refined and optimized using various methods. For example, the database can be refined by adding datasets for new documented gestures and poses. The quality of the database can be improved, for example, by populating the database with cases in which the gestures and/or poses were correctly recognized. In one embodiment, the database includes data, for example, of mistaken identification of gestures and/or poses, which can assist in the evaluation of a trained system.

D. Exemplary Convolutional Neural Networks (CNNs) for Pose Estimation

Figure 7A:
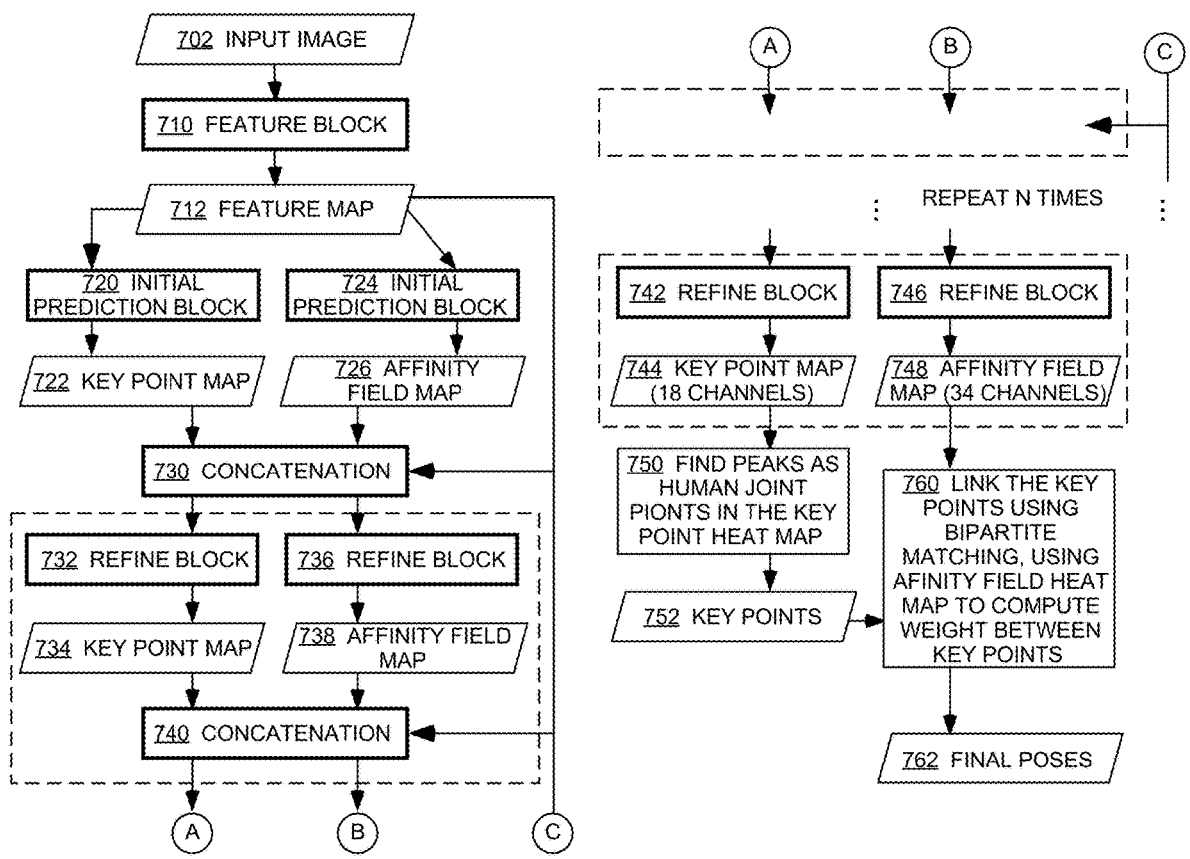
FIG. 7A is a block diagram of an exemplary convolutional neural network (CNN) for pose estimation, in accordance with example embodiments of the disclosure.

FIG. 7A is a block diagram 700 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 7A performs the following steps to estimate the pose of one or more persons in an input image:

1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, input image 702 is first passed through a feature block 710 to generate feature map 712. Initial prediction blocks 720 and 724 then extract key point map 722 and affinity field map 726, respectively. A concatenation operation 730 is performed before further refinements are carried out in multiple iterations. For each stage of iteration, refine blocks such as 732, 736, 742, and 746 predict refined key point maps such as 734 and 744, and affinity field maps such as 738 and 748, respectively. Concatenation operations such as 740 are performed to generate input for the next stage. A total of N refinements may be carried out. For example, N may equal to 5 in some embodiments of the present invention. After the last refinement stage, key point heat map 744 is examined in step 750 to find peaks as human joint points or key points 752. Such key points may be linked in step 760 to generate final poses 762, by performing bipartite matching using affinity field heat map 748 to compute weights between key points. In this illustrative example, key point map 744 may comprise 18 channels, while affinity field map 748 may comprise 34 channels.

FIG. 7B is a detailed block diagram illustrating an exemplary Feature Block 710, according to some embodiments of the present invention. In this example, separable convolutional layers (SCL) are deployed with different kernel and stride sizes.

Correspondingly, FIG. 7C is a detailed block diagram illustrating an exemplary separable convolutional neural network layer 770, according to some embodiments of the present invention. As discussed previously, a depth-wise separable convolution or a separable convolution layer factorizes ta standard convolution into a depth-wise convolution and a point-wise convolution. Batch optimization and ReLU blocks further help improve the accuracy and performance of the network layer.

FIG. 7D is a detailed block diagram illustrating an exemplary Initial Prediction Block 720, according to some embodiments of the present invention. Finally, FIG. 7E is a detailed block diagram illustrating an exemplary Refine Block 732, according to some embodiments of the present invention. Both comprises multiple separable convolutional layers having different kernel sizes.

Illustrative Example Operations for Touchless Control

Figure 8:
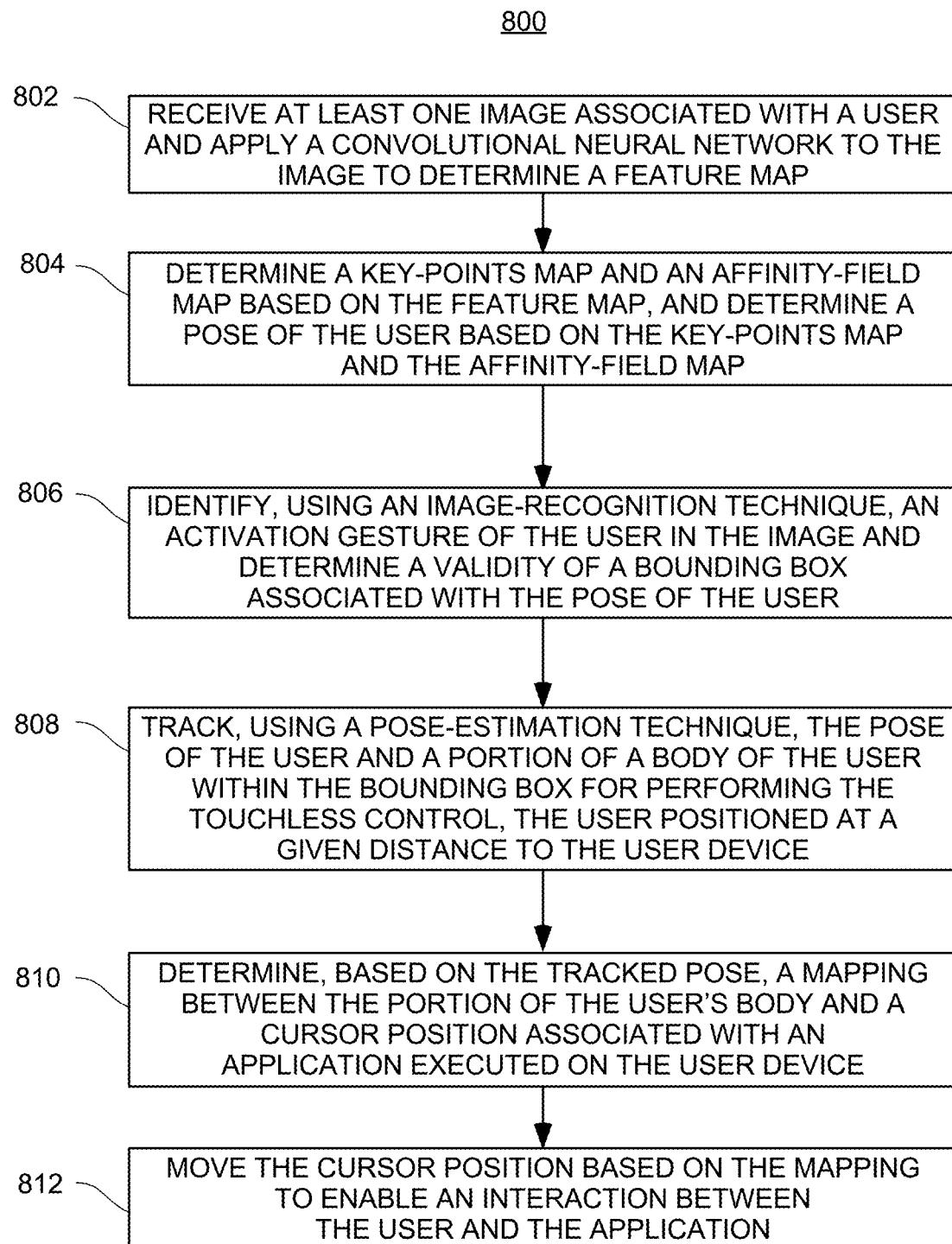
FIG. 8 shows a flowchart diagram illustrating example operations for touchless control, in accordance with example embodiments of the disclosure.

FIG. 8 shows a flowchart diagram 800 illustrating example operations for touchless control, in accordance with example embodiments of the disclosure. At step 802, the method can include receiving at least one image associated with a user and applying a CNN to the image to determine a feature map. In some aspects, the image can be received from a single mobile device camera. In other examples, the image can be part of video (e.g., a video frame), and there can be many images as part of the video, any number of which can be processed (e.g., via the CNN) to obtain the feature map. In some examples, the CNN can process the various regions of the image to generate a number. Further, the CNN can slide a filter over all the regions during processing to generate arrays of numbers, which can be referred to as a feature map. Accordingly, the feature map can serve as a function which maps a data vector (e.g., data associated with the image) to a feature space, a mathematical space that includes features which can include an individual measurable property or characteristic of the poses and gestures being observed.

At step 804, the method can include determining a key-points map and an affinity-field map based on the feature map, and determining a pose of the user based on the key-points map and the affinity-field map. In particular, the disclosed systems can extract coordinate in a skeletal representation of the pose of the user which can include determining joints that can be referred to as a keypoint. In some examples, the affinity map can represent the degree of association between the keypoints and can encode joint to joint relationships.

At step 806, the method can include identifying, using an image-recognition technique, an activation gesture of the user in the image, and determining a validity of a bounding box associated with the pose of the user. In other aspects, the disclosed systems can identify the activation gesture by determining that the activation gesture has an associated duration exceeding a predetermined threshold. Further, the predetermined threshold can be based on a configuration of the activation gesture. For example, a gesture involving the user's hands being above the head of the user can have a given duration threshold while a gesture involving the user displaying a particular hand holding a particular finger in a given orientation can have a different duration threshold. In some examples, the disclosed systems can determine the validity of the bounding box by determining that the bounding box is within threshold margins of an active area of the user device, as shown and described in connection with FIG. 1A.

At step 808, the method can include tracking, using a pose-estimation technique, the pose of the user and a portion of a body of the user within the bounding box for performing the touchless control, the user positioned at a distance to the user device. In particular, the disclosed systems can track the portion of the user's body by applying any suitable pose-estimation technique. Further, the disclosed systems can track the portion of the user's body by applying a smoothing filter (e.g., a Kalman filter) to reduce noisy measurements during the tracking. In other examples, the disclosed systems can generate, using any suitable prediction technique (e.g., machine learning, extrapolation, etc.), a prediction of a location of the user's body at a future time.

In some examples, the disclosed systems can track the pose of the user at a frame rate (e.g., via a camera that runs at about a 30 fps frame rate). Further, the disclosed systems can determine that a value of a refresh rate associated with the user device is different than a value of the frame rate. For example, the disclosed systems can determine that user's mobile device has a rate of about 60 fps to about 120 fps. Accordingly, the disclosed systems can be configured to move the cursor position using a smoothing function, for example, to reduce the amount of jitter and mismatch that may otherwise exist in moving the cursor position based on the tracking frame rate only. Further, the smoothing function can include parameters that are determined based on the frame rate and the refresh rate.

At step 810, the method can include determining, based on the tracked pose, a mapping between the portion of the user's body (e.g., hands) and a cursor position associated with an application executed on the user device. The disclosed systems can use the mapping to move the cursor position in near real-time. In other examples, the disclosed systems can determine a second mapping between a second portion of the user's body (e.g., wrist, elbows, etc.) and the cursor position by applying a mathematical transformation to a representation of the portion of the user's body. In particular, the second mapping can be used to move the cursor position with a finer degree of user control.

At step 812, the method can include moving the cursor position based on the mapping to enable an interaction between the user and the application. In some examples, the disclosed systems can be configured to move the cursor position at an increased speed or at an increased precision based on the second mapping, described above. Further, the disclosed systems can be configured to stabilize the cursor. In particular, the disclosed systems can be configured to determine that a difference between the cursor position and a previous cursor position is within a difference threshold (e.g., a few percentage points with respect to the size of the screen), and then apply a cursor stabilization function to the cursor position. The cursor stabilization function can include any suitable technique such as a position averaging, smoothing, and/or the like. In some examples, the disclosed systems can be configured to move the cursor with different speeds based on the location of the cursor. That is, the disclosed systems can move the cursor position at a first speed and a second speed different from the first speed, wherein the first speed and the second speed are based on the cursor position with respect to an active area of the user device.

Figure 9:
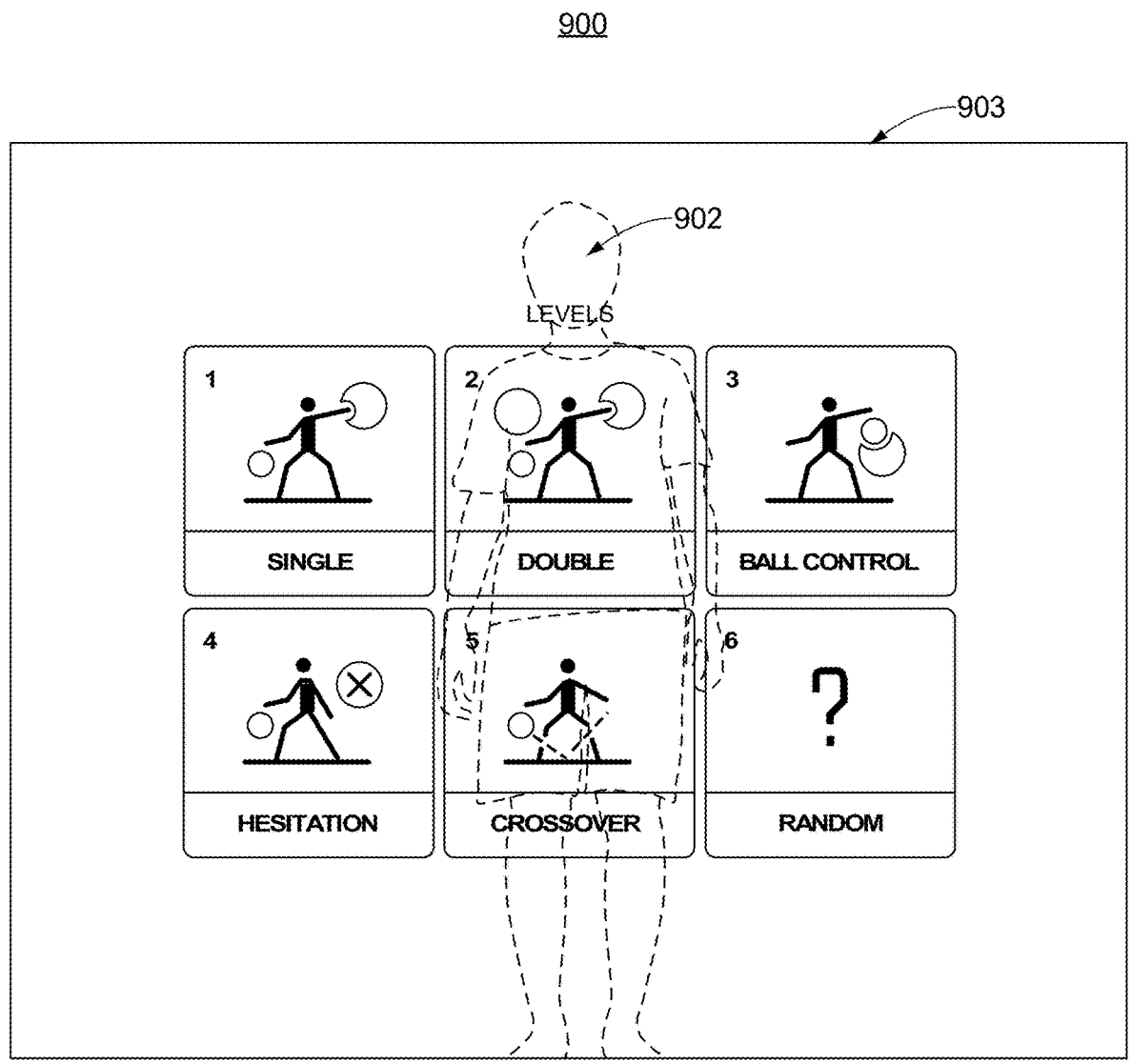
FIG. 9 shows a diagram illustrating a user in a background position with respect to a camera of a user device showing a GUI (graphical user interface) in a foreground, leading to the disclosed systems detecting a presence of the user, in accordance with example embodiments of the disclosure.

FIG. 9 shows a diagram 900 illustrating a user 902 in a background position (dashed lines) with respect to a camera (not shown) of a user device (not shown) displaying a graphical user interface (GUI) 903 in a foreground (solid lines), leading to the disclosed systems detecting a presence of the user 902, in accordance with example embodiments of the disclosure. The presence of the user 902 is detected based on a pose, bounding box, and/or other suitable means as described herein. The GUI 903 displays one or more control elements which may be controlled by touchless control by the user 902 as described herein.

Figure 10:
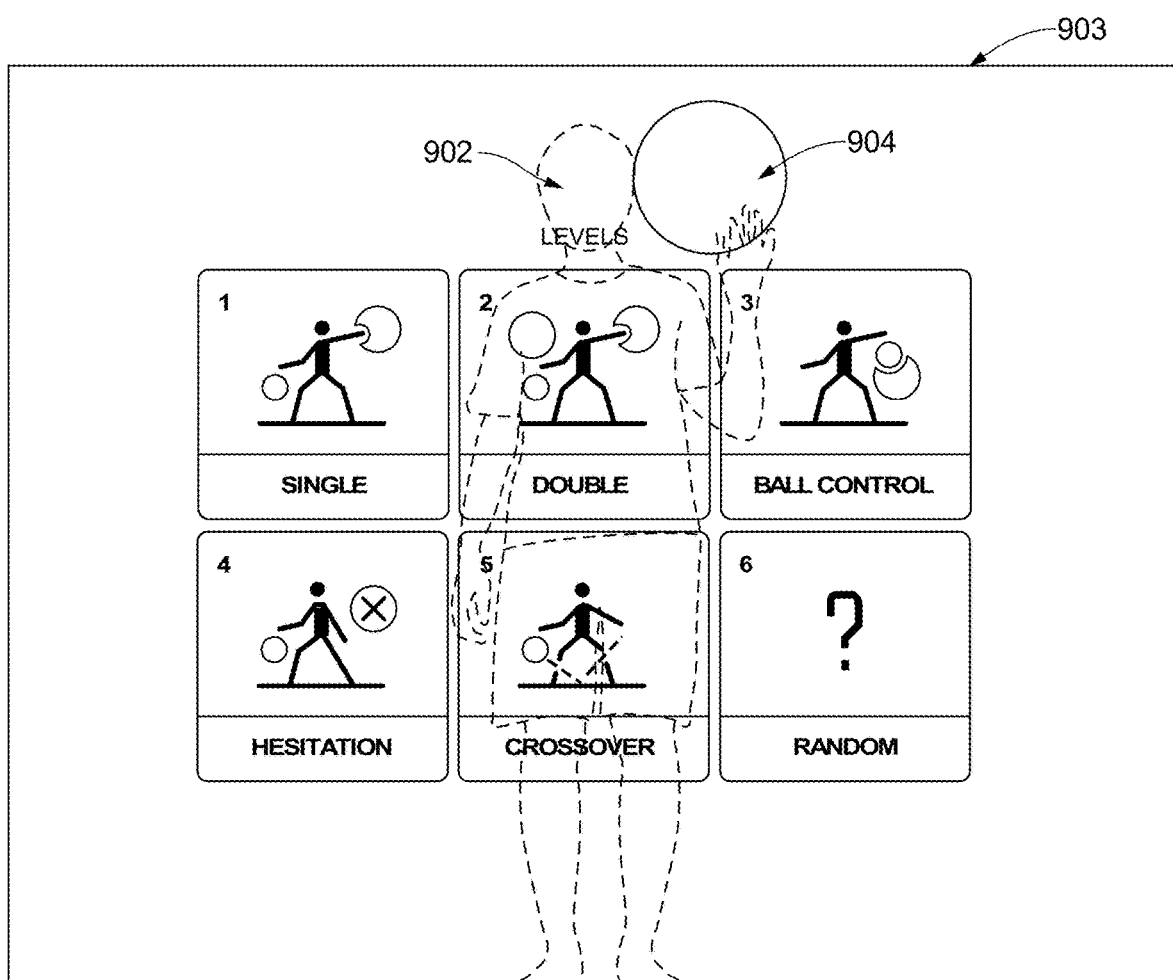
FIG. 10 shows a diagram illustrating the user having an illustrative activation gesture that is interpreted by the disclosed systems to activate a tracking of the user's hand, in accordance with example embodiments of the disclosure.

FIG. 10 shows a diagram 1000 illustrating the user 902 having an illustrative activation gesture that is interpreted by the disclosed systems to activate a tracking of the user's left hand ("stage right"), in accordance with example embodiments of the disclosure. The activation gesture may be one of any suitable activation gestures as described herein. The detection of the activation gesture triggers the display of a cursor 904 on the GUI 903 on the mobile device. The activation gesture may be detected by any suitable means as described herein.

Figure 11:
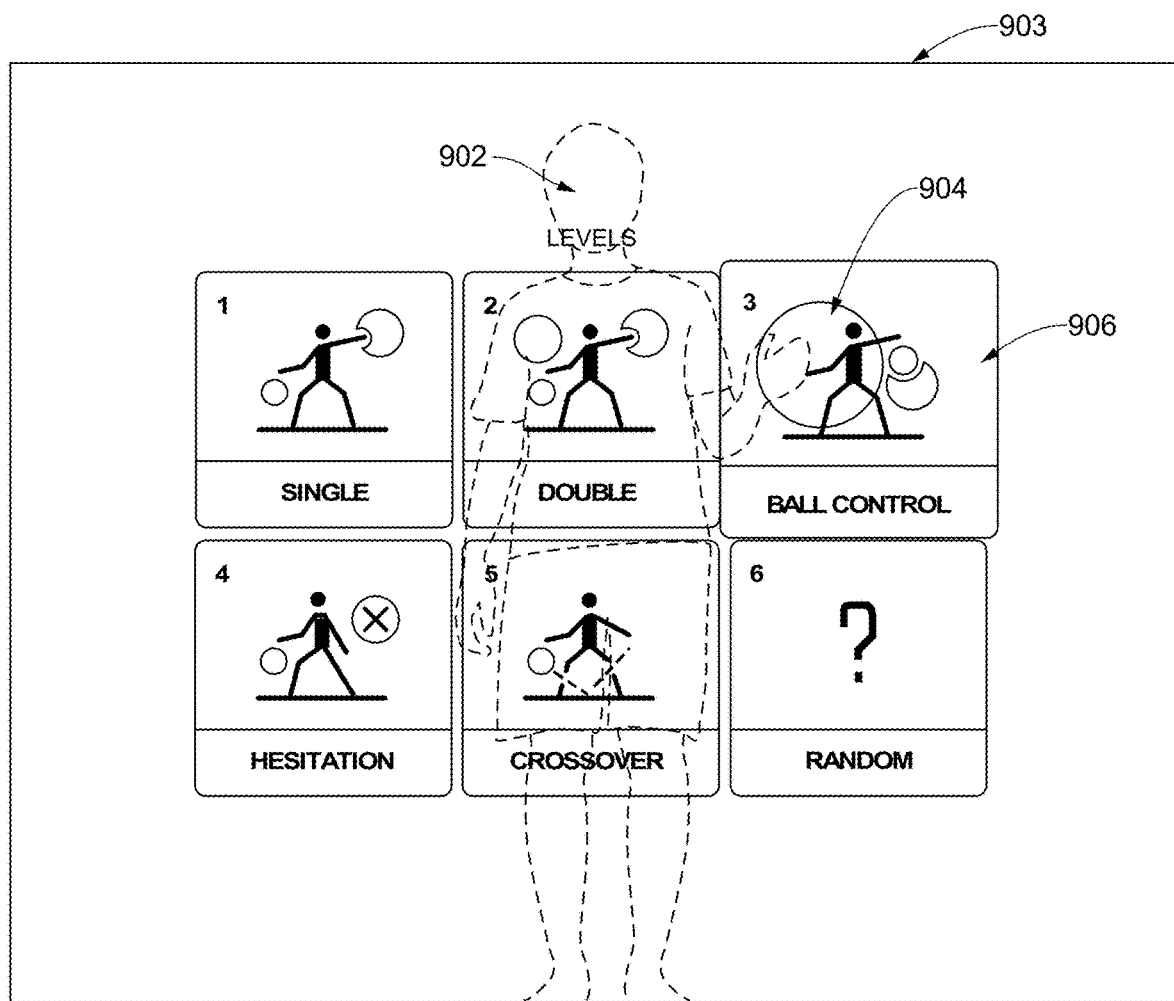
FIG. 11 shows a diagram illustrating the disclosed systems tracking a pose of the user and estimating a location of the user's hand hovering over a selection of a control element in the GUI, in accordance with example embodiments of the disclosure.

FIG. 11 shows a diagram 1100 illustrating the disclosed systems tracking a pose of the user 902 and estimating a location of the user's hand controlling a cursor 904 hovering over a selection of a control element 906 in the GUI 903, in accordance with example embodiments of the disclosure. In one embodiment, the selection of the control element 906 needs to be confirmed via visual feedback to the user 902 on the GUI 903 of the user device. For example, the selection of the control element 906 may be displayed back to the user 902 with a highlight, a change in color, a blinking motion, or any other suitable means used to present control element feedback in the GUI 903.

Figure 12:
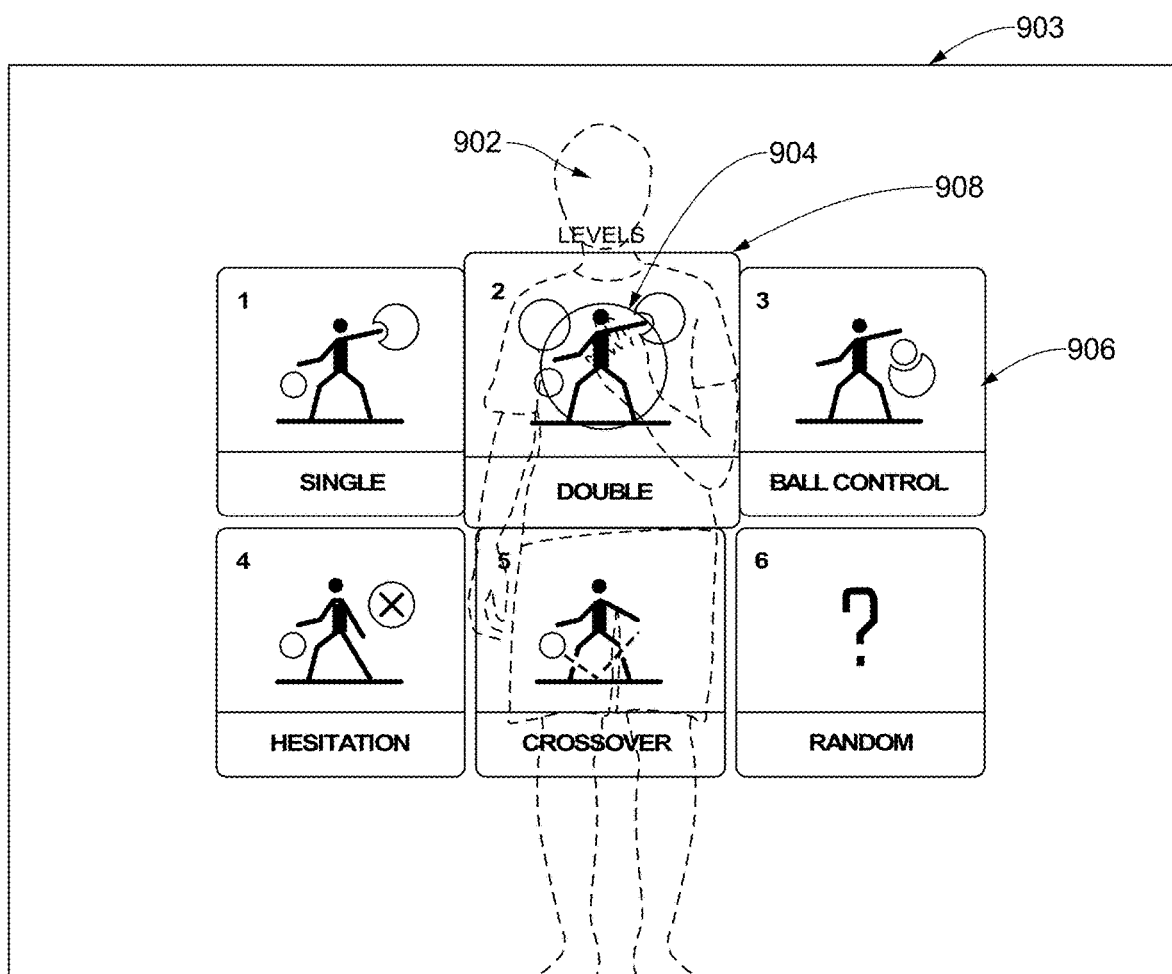
FIG. 12 shows a diagram illustrating the disclosed systems allowing the user to confirm the selection by hovering over the control element in the GUI for a predetermined period of time, in accordance with example embodiments of the disclosure.

Finally, FIG. 12 shows a diagram 1200 illustrating the disclosed systems allowing the user 902 to confirm his or her selection by hovering the cursor 904 over another control element 908 (different from control element 906) in the GUI 903 for a predetermined period of time, in accordance with example embodiments of the disclosure. In one embodiment, the confirmation of the activation of the control element 908 is confirmed via visual feedback to the user 902 on the GUI 903 of the user device. For example, the confirmation of the activation of the control element 908 may be displayed back to the user with a highlight, a change in color, a blinking motion, or any other suitable means used to present control element feedback in the GUI 903. In one embodiment, the confirmation of the activation of the control element 908 is shown to the user with a growing colored bar over the control element, which enlarges in time over the predetermined period of activation, as illustrated schematically in FIGS. 11 and 12 with a slightly enlarged box corresponding to the actively selected control element, either control element 906 in FIG. 11 or control element 908 in FIG. 12. Once the predetermined period of time has elapsed, and the user 902 has indicated his or her confirmation of the activation of the control element 908 in the GUI 903, then the corresponding GUI operation is triggered by the system by a function or subroutine activation, application programming interface (API) call, or the like.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to one specific exemplary embodiment of a specific control element in a GUI, one of ordinary skill in the art would recognize that the present invention may be applied to other GUIs, control elements, games, presentations, and so forth. One of ordinary skill in the art would recognize that the methods and systems taught in the present disclosure can be applied, without loss of generality, to various GUI controls.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A device, comprising:
   at least one memory device that stores computer-executable instructions; and
   at least one processor configured to access the memory device, wherein the processor is configured to execute the computer-executable instructions to:
   receive at least one image;
   determine a first map, the first map comprising a function that generates a correspondence between data associated with the image to a feature space;
   determine a second map comprising a representation of a user in the image based on the first map;
   determine a third map comprising a field associated with the data in the image;
   determine a characteristic of the user based on one or more of the second map and the third map;
   track the characteristic of the user for performing control of the device to generate a historical data of the characteristic;
   determine, based on the tracking, a mapping between the characteristic and an input feature associated with the device;
   modify the input feature to a first location based on the mapping; and
   modify the input feature to a second location different from the first location based on the historical data.

2. The device of claim 1, wherein the computer-executable instructions to determine the characteristic comprise computer-executable instructions to determine that the characteristic has an associated duration exceeding a predetermined threshold.

3. The device of claim 1, wherein the computer-executable instructions to track the characteristic comprise computer-executable instructions to apply a filter to measurements during the tracking.

4. The device of claim 1, further comprising computer-executable instructions to determine a second mapping between a second characteristic of the user and the input feature by applying a mathematical transformation to the characteristic.

5. The device of claim 4, further comprising computer-executable instructions to modify the input feature at a different speed or at a different precision based on at least one of the mapping or the second mapping.

6. The device of claim 1, further comprising computer-executable instructions to:
   track the characteristic of the user at a frame rate;
   determine that a value of a refresh rate associated with the device is different than a value of the frame rate; and
   modify the input feature using a smoothing function, the smoothing function comprising parameters that are determined based on at least one of the frame rate and the refresh rate.

7. A method, comprising:
   receiving at least one image;
   determining a first map, the first map comprising a function that generates a correspondence between data associated with the image to a feature space;
   determining a second map comprising a representation of a user in the image based on the first map;
   determining a third map comprising a field associated with the data in the image;
   determining a characteristic of the user based on one or more of the second map and the third map;
   tracking the characteristic of the user for performing control of the device to generate a historical data of the characteristic;
   determining, based on the tracking, a mapping between the characteristic and an input feature associated with the device;
   modifying the input feature to a first location based on the mapping; and
   modifying the input feature to a second location different from the first location based on the historical data.

8. The method of claim 7, wherein the determining the characteristic further comprises determining that the characteristic has an associated duration exceeding a predetermined threshold.

9. The method of claim 7, wherein the tracking the characteristic further comprises applying a filter to measurements during the tracking.

10. The method of claim 7, further comprising determining a second mapping between a second characteristic of the user and the input feature by applying a mathematical transformation to the characteristic.

11. The method of claim 10, further comprising modifying the input feature at a different speed or at a different precision based on at least one of the mapping or the second mapping.

12. The method of claim 7, further comprising:
    tracking the characteristic of the user at a frame rate;
    determining that a value of a refresh rate associated with the device is different than a value of the frame rate; and
    modifying the input feature using a smoothing function, the smoothing function comprising parameters that are determined based on at least one of the frame rate and the refresh rate.

13. A non-transitory computer-readable medium storing computer-executable instructions which, when executed by a processor, cause the processor to perform operations comprising:
    receiving at least one image;
    determining a first map, the first map comprising a function that generates a correspondence between data associated with the image to a feature space;
    determining a second map comprising a representation of a user in the image based on the first map;
    determining a third map comprising a field associated with the data in the image;
    determining a characteristic of the user based on one or more of the second map and the third map;
    tracking the characteristic of the user for performing control of the device to generate a historical data of the characteristic;

determining, based on the tracking, a mapping between the characteristic and an input feature associated with the device;

modifying the input feature to a first location based on the mapping; and modifying the input feature to a second location different from the first location based on the historical data.

14. The non-transitory computer-readable medium of claim 13, wherein the computer-executable instructions to determine the characteristic comprise computer-executable instructions to determine that the characteristic has an associated duration exceeding a predetermined threshold.

15. The non-transitory computer-readable medium of claim 13, wherein the computer-executable instructions to track the characteristic comprise computer-executable instructions to apply a filter to measurements during the tracking.

16. The non-transitory computer-readable medium of claim 13, further comprising computer-executable instructions to determine a second mapping between a second characteristic of the user and the input feature by applying a mathematical transformation to the characteristic.

17. The non-transitory computer-readable medium of claim 16, further comprising computer-executable instructions to modify the input feature at a different speed or at a different precision based on at least one of the mapping or the second mapping.

18. The non-transitory computer-readable medium of claim 13, further comprising computer-executable instructions to:

track the characteristic of the user at a frame rate;

determine that a value of a refresh rate associated with the device is different than a value of the frame rate; and modify the input feature using a smoothing function, the smoothing function comprising parameters that are determined based on at least one of the frame rate and the refresh rate.

* * * * *